United States Patent [19]
Hirokane et al.

[11] Patent Number: 6,150,038
[45] Date of Patent: Nov. 21, 2000

[54] MAGNETO-OPTICAL RECORDING MEDIUM

[75] Inventors: Junji Hirokane, Nara; Noboru Iwata, Tenri, both of Japan

[73] Assignee: Sharp Kabushiki Kaisha, Osaka, Japan

[21] Appl. No.: 09/300,261

[22] Filed: Apr. 27, 1999

[30] Foreign Application Priority Data

Apr. 27, 1998 [JP] Japan .................................. 10-116332
Dec. 24, 1998 [JP] Japan .................................. 10-365860

[51] Int. Cl.$^7$ .............................. B32B 15/18; B32B 9/00; B32B 9/04; G11B 5/66; H01F 1/00
[52] U.S. Cl. ........................ 428/638; 427/131; 427/132; 428/639; 428/641; 428/642; 428/651; 428/653; 428/654; 428/662; 428/667; 428/668; 428/670; 428/675; 428/676; 428/694 RE; 428/694 XS; 428/694 NF; 428/694 EC; 428/694 TP; 428/694 TM; 428/698; 428/699; 428/701; 428/702; 428/704; 428/900; 428/928
[58] Field of Search ................................... 428/638, 639, 428/641, 642, 651, 653, 654, 662, 667, 668, 670, 675, 676, 694 RE, 694 XS, 694 NF, 694 EC, 694 TP, 694 TM, 698, 699, 701, 702, 704, 900, 928; 427/131, 132

[56] References Cited

FOREIGN PATENT DOCUMENTS 10-92017  4/1998  Japan .

OTHER PUBLICATIONS

"High–Density Magneto–Optical Recording with Domain Wall Displacement Detection", T. Shiratori, et al., Joint Magneto–Optical Recording International Symposium/International Symposium on Optical Memory, 1997, Techical Digest, TU–E–04, pp. 38–39. (No Month Avail.).

*Primary Examiner*—Bernard Pianalto
*Attorney, Agent, or Firm*—Dike, Bronstein, Roberts & Cushman, LLP; David G. Conlin

[57] ABSTRACT

A reproducing layer, an intermediate layer, and a recording layer are successively stacked. The reproducing layer is made of a perpendicularly magnetized film whose domain wall coercivity is relatively smaller and whose domain wall mobility is relatively larger as compared with the recording layer around a reproducing temperature. When the reproducing layer, the intermediate layer, and the recording layer have Curie temperatures of Tc1, Tc2, and Tc3, Tc1, Tc2, and Tc3 satisfy a relationship of Tc2<Tc1<Tc3. Upon reproducing information, the reproducing layer is partially heated to more than the Curie temperature by irradiating with a light beam. This arrangement makes it possible to expand and reproduce a domain without causing a repetition of reproduction and to reproduce a signal having a period which is not more than an optical diffraction limit without reducing an amplitude of the reproduced signal, thereby dramatically improving a recording density.

32 Claims, 19 Drawing Sheets

↑ TH moment   ⇧ total magnetization

↑ TM moment    ⇧ total magnetization

MAGNETO-OPTICAL RECORDING MEDIUM

FIELD OF THE INVENTION

This invention relates to magneto-optical recording media such as a magneto-optical disk, a magneto-optical tape, and a magneto-optical card, and further relates to a reproducing apparatus for reproducing the above-mentioned media and a reproducing method.

BACKGROUND OF THE INVENTION

Conventionally, as a rewritable optic recording medium, a magneto-optical recording medium has been put into practical use. Such a magneto-optical recording medium has the following drawback: when a diameter and spacing of a recording bit, that serve as a domain, become smaller with regard to a beam diameter of a light beam emitted from a semiconductor laser which is converged on the magneto-optical recording medium, the reproducing property tends to deteriorate.

Such a drawback is caused by an adjacent recording bit which enters in the beam diameter of the light beam converged on a desired recording bit and which does not allow individual recording bits to be separately reproduced.

In order to overcome the above-mentioned drawback, a reading material such as "High-Density Magneto-Optical Recording with Domain Wall Displacement Detection" (Joint Magneto-optical Recording International Symposium/International Symposium on Optical Memory 1997 Technical Digest, Tu-E-04, p.38,39) shows a magneto-optical recording medium in which a first, second, and third magnetic layers are successively stacked. In the magneto-optical recording medium, the first magnetic layer is made of a perpendicularly magnetized film which has a domain wall coercivity which is relatively smaller than that of the third magnetic layer and has a domain wall mobility which is relatively larger than that of the third magnetic layer, around a reproducing temperature; and the second magnetic layer has a Curie temperature which is lower than those of the first and third magnetic layers. The above-mentioned reading material shows a technology in which the magneto-optical recording medium is used so as to shift the domain wall to an area whose temperature rises due to irradiation of a light beam and to separately reproduce individual recording bits without causing a reduction in intensity of a reproduced signal, even when the diameter and spacing of the recording bit is small.

FIG. 24 shows the reproducing method. In FIG. 24, a first magnetic layer 1, a second magnetic layer 2, and a third magnetic layer 3 are stacked in a state of an exchange coupling. On the assumption that the layers respectively have Curie temperatures of Tc1, Tc2, and Tc3, it is understood that a relationship of Tc2<Tc1 exists. In FIG. 24, arrows indicate the direction of the transition metal magnetic moment of each of the magnetic layers. Additionally, in FIG. 24, a recorded domain has already been formed in the third magnetic layer 3, in which upward domains and downward domains alternately exist.

In such a magneto-optical recording medium, when a light beam 4 for reproducing is converged and emitted from the first magnetic layer 1, an area whose temperature exceeds the Curie temperature(shown by a hatched part) appears in the second magnetic layer 2. At this time, in an area whose temperature is lower than the Curie temperature, the exchange coupling allows domain information of the third magnetic layer 3 to be transferred to the first magnetic layer 1 via the second magnetic layer 2. Namely, upward transition metal magnetic moment, which appears at the front end of an area 8 irradiated with a light beam, is directly transferred from the third magnetic layer 3 to the first magnetic layer 1. Meanwhile, in the area whose temperature rises above the Curie temperature in the second magnetic layer 2(the medium shifts in accordance with a rotation of a disk substrate, etc., so that the area is located behind the optical beam 4, in other words, on the side of "medium shifting direction" in FIG. 24), the second magnetic layer 2 interrupts the exchange coupling between the first magnetic layer 1 and the third magnetic layer 3; thus, the domain wall of the first magnetic layer 1 can readily shift.

When the information of the third magnetic layer 3 is directly transferred to the first magnetic layer 1, a domain wall 5 is supposed to be formed; however, on the area whose temperature exceeds the Curie temperature in the second magnetic layer 2, a domain wall of the first magnetic layer 1 readily shifts, the domain wall 5 shifts to the most stable position. Here, in view of the fact that energy density of the domain wall becomes smaller as the temperature increases, the domain wall 5 is supposed to shift to a position whose temperature is increased to the highest due to irradiation of the light beam 4 so as to a domain wall 6 is formed.

As described above, in the magneto-optical recording medium, the characteristic of the second magnetic layer 2 makes it possible to shift the domain wall. With this arrangement, a recording domain of the third magnetic layer 3 is allowed to expand in the first magnetic layer 1. Therefore, even if the recording domain is small, it is possible to increase an amplitude of a reproduced signal and to reproduce a signal having a period which is not more than an optical diffraction limit.

However, in the above-mentioned reproducing method, the domain wall shifts from the front end and from the rear end so that one domain is reproduced twice. Referring to FIGS. 25 and 26, the following explanation describes this drawback.

FIG. 25 illustrates a state in which an isolated domain 7 formed in the third magnetic layer 3 exists at the front end of the light beam 4, the third magnetic layer 3 and the first magnetic layer 1 are exchangeably coupled to each other at the position of the isolated domain 7, and the upward moment is transferred to the first magnetic layer 1. Additionally, in FIG. 25, a hatched part in the second magnetic layer 2 is an area X which is heated to more than the Curie temperature.

In the state described in FIG. 25, as described above, the domain wall 5 shifts to the domain wall 6 so as to expand the domain, and a reproduced domain 9, which has upward moment with regard to the area 8 irradiated with the light beam 4, is formed; thus, it is possible to obtain a large amplitude of the reproduced signal.

In a state described in FIG. 25, when the medium (magneto-optical recording medium) shifts relative to the optical beam 4 and the isolated domain 7 passes through the area X, downward moment of the third magnetic layer 3 is transferred to the first magnetic layer 1 and the moment of the area 9 goes downward(not shown).

Further, when the medium shifts so as to have a state illustrated in FIG. 26, namely, in a state in which the isolated domain 7 exists at the rear end of the area X of the second magnetic layer 2, upward moment of the isolated domain 7 of the third magnetic layer 3 is transferred to the first magnetic layer 1, and a domain wall 5' shifts to a domain wall 6' which is located at the most stable position.

Therefore, with regard to the area 8 irradiated with the light beam 4, a reproduced domain 10 exists with upward moment.

As described above, the isolated domain 7 is reproduced when the isolated domain 7 is located at the front end of the area X, which is heated to more than the Curie temperature due to irradiation of a light beam in the second magnetic layer 2(state described in FIG. 25), and the isolated domain 7 is reproduced once again when the isolated domain 7 is located at the rear end of the area X(state described in FIG. 26).

As described in "High-Density Magneto-Optical Recording with Domain Wall Displacement Detection" (Joint Magneto-optical Recording International Symposium/International Symposium on Optical Memory 1997 Technical Digest, Tu-E-04, p.38,39), this phenomenon considerably tends to appear in a relatively long recording domain in which the third magnetic layer 3 and the first magnetic layer 1 are exchangeably coupled to each other in a stable manner.

As described above, the conventional magneto-optical recording medium is not capable of stably reproducing a relatively long recording domain and causes a serious problem upon recording and reproducing in a higher density by using a mark edge recording method.

SUMMARY OF THE INVENTION

The present invention is devised in order to solve the above-mentioned conventional problem. The objective is to provide a magneto-optical recording medium, a reproducing apparatus, and a reproducing method which are capable of reproducing a signal whose period is not more than the optical diffraction limit, without reducing an amplitude of the reproduced signal, and which cause no repetition of reproduction even when a recording domain is long.

In order to achieve the above-mentioned objective, the magneto-optical recording medium of the present invention includes: a recording layer, an intermediate layer in which an area for interrupting an exchange coupling to the recording layer is formed at a predetermined temperature or more, and a reproducing layer which is made of a perpendicularly magnetized film whose domain wall coercivity is relatively smaller and whose domain wall mobility is relatively larger as compared with the recording layer around a predetermined temperature, the reproducing layer being arranged so as to have a composition which, upon reproducing, is allowed to partially form an area whose temperature exceeds a Curie temperature of the reproducing layer, on the area of the intermediate layer that interrupts the exchange coupling.

Further, the reproducing apparatus of the present invention for reproducing the magneto-optical recording medium, the magneto-optical recording medium including: a recording layer, an intermediate layer in which an area for interrupting an exchange coupling to the recording layer is formed at a predetermined temperature or more, and a reproducing layer which is made of a perpendicularly magnetized film whose domain wall coercivity is relatively smaller and whose domain wall mobility is relatively larger as compared with the recording layer around a predetermined temperature, the reproducing layer being arranged so as to have a composition which, upon reproducing, is allowed to partially form an area whose temperature exceeds a Curie temperature of the reproducing layer, on the area of the intermediate layer that interrupts the exchange coupling, the reproducing apparatus including an irradiating means for emitting a light beam on the magneto-optical recording medium upon reproducing, and a controlling means for controlling intensity of an irradiated light beam so as to heat the reproducing layer of the magneto-optical recording medium to more than the Curie temperature.

Furthermore, a reproducing method of the magneto-optical recording medium, the magneto-optical recording medium including: a recording layer, an intermediate layer in which an area for interrupting an exchange coupling to the recording layer is formed at a predetermined temperature or more, and a reproducing layer which is made of a perpendicularly magnetized film whose domain wall coercivity is relatively smaller and whose domain wall mobility is relatively larger as compared with the recording layer around a predetermined temperature, the method including the step of heating the reproducing layer upon reproducing so as to partially generate the area, whose temperature exceeds the Curie temperature of the reproducing layer, on the area of the intermediate layer that interrupts the exchange coupling, the area of the reproducing layer regulating a shift of a domain wall.

The above-mentioned arrangement makes it possible to expand and reproduce a domain without causing a repetition of reproduction and to reproduce a signal whose period is not more than an optical diffraction limit without reducing an amplitude of the reproduced signal, thereby dramatically improving a recording density.

For a fuller understanding of the nature and advantages of the invention, reference should be made to the ensuing detailed description taken in conjunction with the accompanying drawings.

DESCRIPTION OF THE EMBODIMENTS

The following explanation describes the detail of a magneto-optical recording medium in accordance with the present invention. Firstly, the principle is discussed with regard to the magneto-optical recording medium of the present invention.

Figure 1:
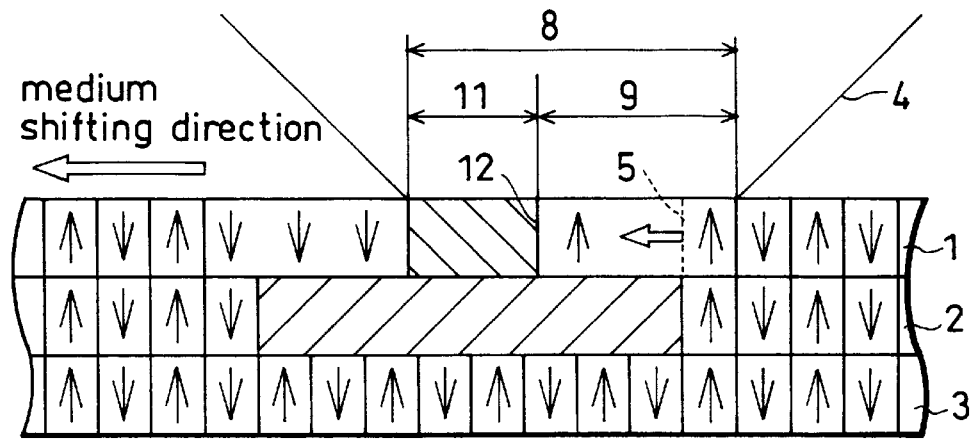
FIG. 1 is a sectional model drawing for explaining a principle of reproduction of a magneto-optical disk of the present invention.

FIG. 1 is a sectional model drawing which shows a reproducing state of the magneto-optical recording medium of the present invention. In the magneto-optical recording medium of the present invention, a first magnetic layer (reproducing layer)1, a second magnetic layer(intermediate layer)2, and a third magnetic layer(recording layer)3 are successively stacked. The first magnetic layer 1 is made of a perpendicularly magnetized film whose domain wall coercivity is relatively smaller and whose domain wall mobility is relatively larger as compared with the third magnetic layer 3 around the reproducing temperature. Further, when the Curie temperatures of the first magnetic layer 1, the second magnetic layer 2, and the third magnetic layer 3 are respectively represented by Tc1, Tc2, and Tc3, each of the magnetic layers is arranged so as to have a magnetic property which satisfies the condition of Tc2<Tc1<Tc3.

Such a magneto-optical recording medium records information in the third magnetic layer 3 as upward magnetization moment and downward magnetization moment. And then, a reproducing operation is performed as follows:

At room temperature, the first magnetic layer 1, the second magnetic layer 2, and the third magnetic layer 3 are exchangeably coupled to one another so that information recorded in the third magnetic layer 3 is transferred to the first magnetic layer 1 via the second magnetic layer 2.

Upon reproducing, an optical beam irradiating means of a reproducing apparatus emits a light beam 4 on the first magnetic layer 1 so that the second magnetic layer 2 forms an heated area whose temperature exceeds the Curie temperature(shown by hatch lines sloped to upper right in the figure). At this time, in the heated area, the magnetization of the second magnetic layer 2 disappears so that the exchange coupling is interrupted, and in the first magnetic layer 1, a domain wall located on the heated area can readily shift. Therefore, in the area whose temperature exceeds the Curie temperature in the second magnetic layer 2, a domain wall 5 shifts backward so as to form a large domain.

In prior art, in this step, the domain wall shifts again at the rear end of the optical beam 4 which is irradiated on the first magnetic layer 1; thus, the same recording domain is repeatedly reproduced as described above.

Therefore, in the magneto-optical recording medium of the present invention, the first magnetic layer 1, the second magnetic layer 2, the third magnetic layer 3 are arranged so as to satisfy the condition of Tc2<Tc1<Tc3. Further, upon reproducing information, the optical beam irradiating means of the reproducing apparatus emits an optical beam on the magneto-optical recording medium so as to heat the magneto-optical recording medium to more than a predetermined temperature(reproducing temperature). More specifically, in the first magnetic layer as well, a optical beam is controlled so as to have sufficient intensity for forming an area whose temperature exceeds the Curie temperature. And then, the optical beam is irradiated on the magneto-optical recording medium.

Figure 27:
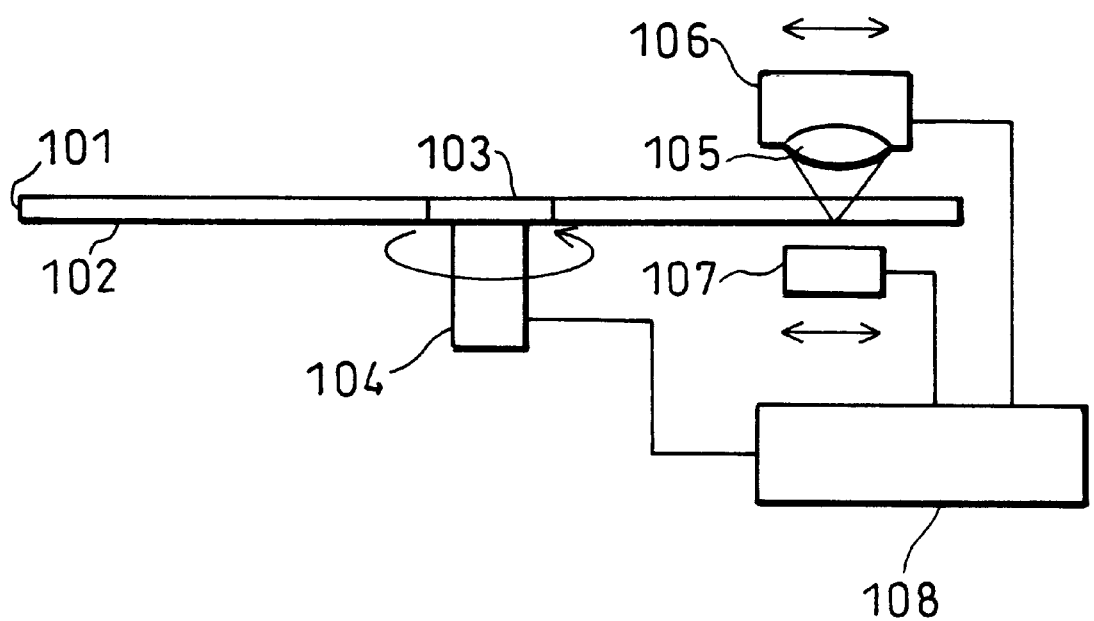
FIG. 27 is an explanatory drawing schematically showing a construction of reproducing apparatus.

Here, FIG. 27 schematically shows a construction of the reproducing apparatus. Further, the reproducing apparatus merely needs to reproduce the magneto-optical recording medium; therefore, the reproducing apparatus is provided with at least an optical pickup 106 serving as an optical beam irradiating means, and a controller 108 serving as a control means for controlling intensity of the optical beam emitted from the optical pickup 106.

A magneto-optical disk 101, in which a magneto-optical recording medium 102 is formed, is fixed via a center hub 103 on a spindle which is capable of rotating so that the magneto-optical disk 101 rotates together with the spindle 104. The optical pickup 106, which serves as a light source upon reproducing, is provided with a semiconductor laser light source and an objective lens 105. The optical pickup 106 is disposed in a manner so as to move in the diameter direction on the magneto-optical disk 101, and converges light emitted from the semiconductor laser light source via the object lens 105 onto the magneto-optical recording medium 102. Upon reproducing information recorded in the magneto-optical disk, the optical beam is intense enough to heat a first magnetic layer 1(reproducing layer) of the magneto-optical recording medium 102 to more than the Curie temperature. The intensity of the optical beam is also controlled so as to heat a third magnetic layer 3(recording layer) at less than the Curie temperature.

Further, upon recording information into the magneto-optical recording medium 102 by using the above-mentioned apparatus, it is necessary to further arrange a magnetic field generating means 107 on the opposite side of the optical pickup 106. Furthermore, upon recording information, while the optical pickup 106 emits an optical beam on the magneto-optical recording medium 102 at a certain output, the magnetic field generating means 107 generates a recording magnetic field so that it is possible to record information into the magneto-optical recording medium 102. At this time, the intensity of the optical light beam is controlled so as to heat the third magnetic layer 3(recording layer) of the magneto-optical recording medium 102 to more than the Curie temperature.

Moreover, in addition to control on reproducing power and recording power of the optical pickup, the controller 108 exerts control on rotation of the spindle 104, focusing and tracking of the optical pickup 106, and intensity of the generated magnetic field of the magnetic field generating means 107, and so on.

With this arrangement, in the first magnetic layer 1, it is possible to form an area 11(shown by hatch lines sloped to lower right in the figure) whose magnetization disappears due to a rise in temperature. The area 11 makes it possible to prevent the domain wall from shifting from the rear end of the optical beam 4.

As described above, upon reproducing, the first magnetic layer 1 is arranged so as to form an area whose temperature exceeds the Curie temperature of the first magnetic layer 1, namely, the area 11, on a portion of the second magnetic layer 2 that has a temperature exceeding the Curie temperature; therefore, it is possible to prevent the same domain from being repeatedly reproduced.

Figure 2:
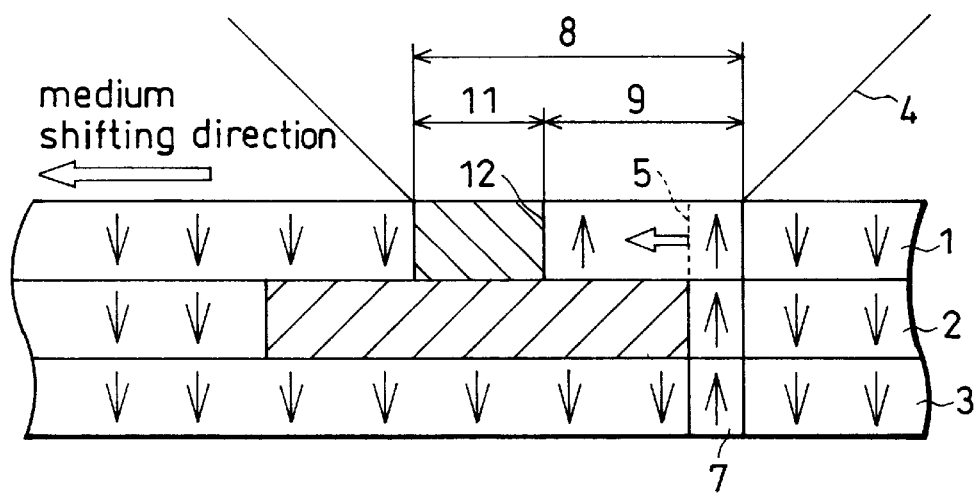
FIG. 2 is a sectional model drawing for explaining a state in which a medium shifts in FIG. 1.
Figure 3:
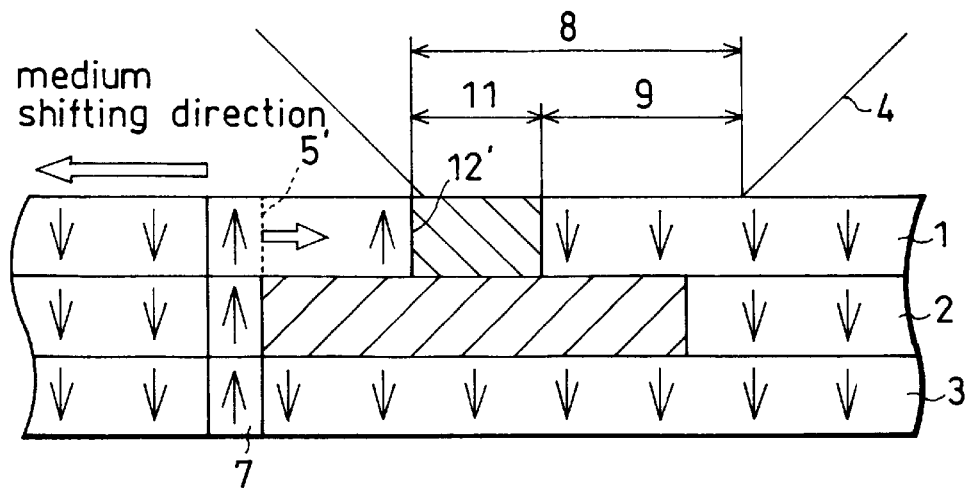
FIG. 3 is a sectional model drawing for explaining another state in which the medium shifts in FIG. 1.
Figure 25:
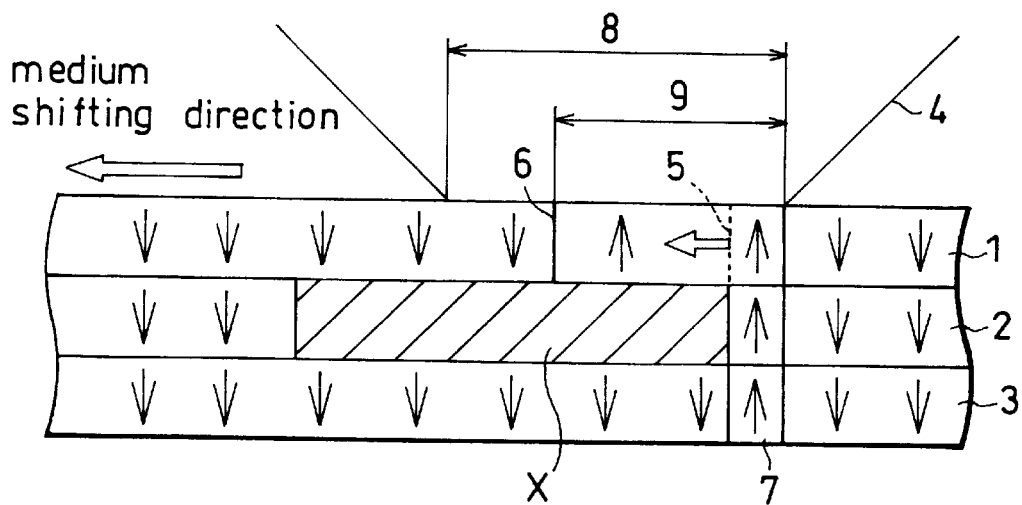
FIG. 25 is a sectional model drawing for explaining a state in which a medium shifts in FIG. 24.
Figure 26:
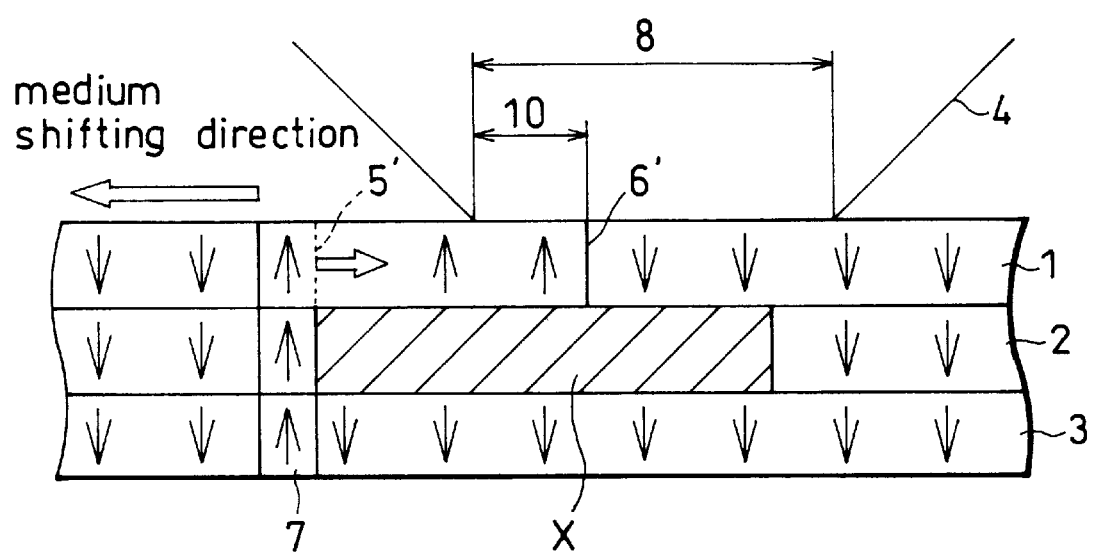
FIG. 26 is a sectional model drawing for explaining another state in which the medium shifts in FIG. 24.

In the same manner as FIGS. 25 and 26 which describe prior art, FIGS. 2 and 3 are sectional model drawings which show a state in which an isolated domain 7 shifts in accordance with the shift of the medium.

As shown in FIG. 2, in the case when the isolated domain 7 is located at the front end, in the same manner as described in FIG. 25, the domain wall 5 shifts to an edge 12 of a Curie temperature area 11 so as to expand and reproduce the domain. Meanwhile, as shown in FIG. 3, in the case when the isolated domain 7 is located at the rear end, namely, on the side of magneto-optical "recording medium shifting direction", a domain wall 5' shifts to an edge 12' of the Curie temperature area 11. Namely, the shift of the domain wall 5' is regulated at the edge 12'.

Here, around the rear end, the domain expanded by the shift of the domain wall 5' is located outside an irradiation area 8 of the optical beam 4. Namely, after the domain has been expanded, the Curie temperature area 11 is formed so as to range from somewhere in the irradiation area 8 to the rear end of the irradiation area 8. Therefore, the domain expanded by the shift of the domain wall 5' is not reproduced by the light beam 4. Thus, it is possible to expand and reproduce the domain merely at the front end without causing the repetition of reproduction, that is described in FIGS. 25 and 26.

Therefore, it is possible to precisely reproduce a long recording domain and to respond to a high-density mark edge recording.

[First Embodiment]

Referring to figures, the following explanation describes one embodiment of the present invention.

Figure 4:
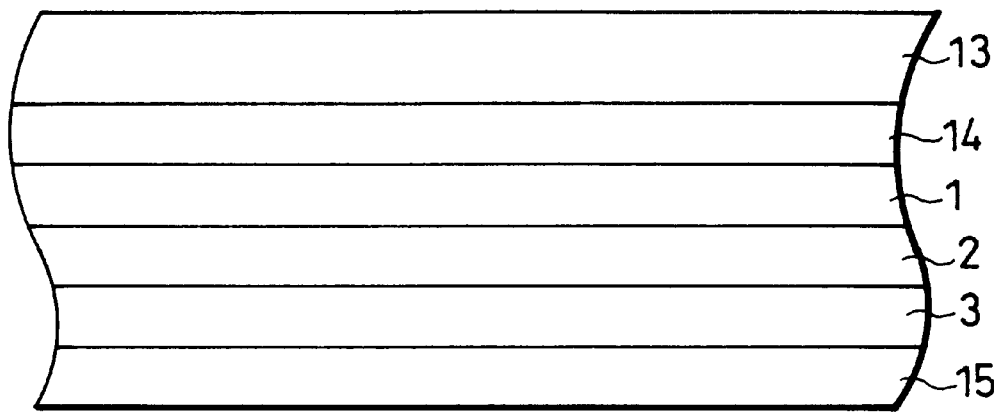
FIG. 4 is a sectional view showing a construction of the magneto-optical disk of the first embodiment.

As shown in FIG. 4, the magneto-optical recording medium of the present embodiment has a construction in which a transparent dielectric protecting layer 14, a first magnetic layer 1, a second magnetic layer 2, a third magnetic layer 3, and a protecting layer 15 are successively formed on a magneto-optical disk substrate 13.

In such a magneto-optical disk, a Curie temperature recording method is adopted as a recording method. The recording is performed as follows: a light beam 4 is converged into the first magnetic layer 1 through the substrate 13 and the transparent dielectric protecting layer 14, and adds external magnetic field while increasing the temperature of the third magnetic layer 3 to more than a Curie temperature so as to control the magnetizing direction of the third magnetic layer 3.

Further, upon reproducing, the light beam 4 is set to be lower than that of recording, and a magneto-optical effect known as a polar Kerr effect allows information to be reproduced. The polar Kerr effect is a phenomenon in which magnetization being perpendicular to a light-incident surface causes inverse rotation of a polarizing surface of reflected light.

Figure 5:
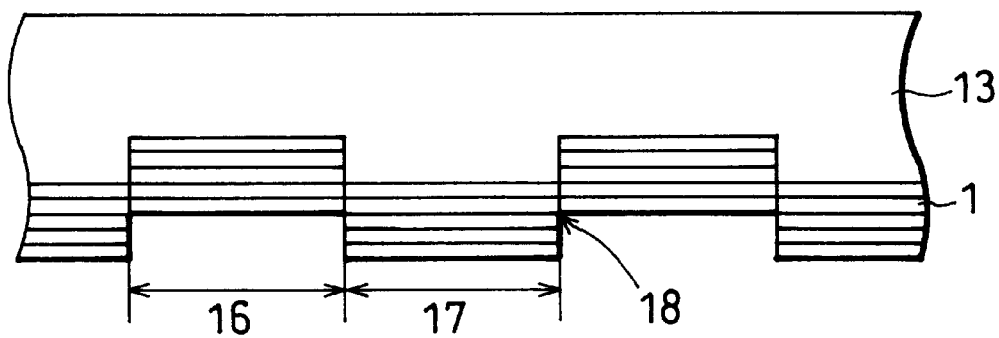
FIG. 5 is a sectional view showing a construction of the magneto-optical disk formed on a substrate which includes a guide groove.

FIG. 5 is a sectional view showing the magneto-optical recording medium formed on the substrate 13 having a guide groove 16. The substrate 13 is, for example, made of a base transparent material such as a polycarbonate and is made into a disk with the guide groove 16 for directing the light beam 4 on a film-forming surface. In the present invention, the guide groove 16 can be arranged so as to record merely for one of a land 17 and the guide 16, and can be also arranged so as to record for both the land 17 and the guide groove 16. It is desirable that the depth of the guide groove 16 be more than twice as large as the film thickness of the first magnetic layer 1.

The depth of the guide groove 16 is formed into a rectangular with a length of 100 nm, which is more than twice as large as the film thickness of the first magnetic layer 1, 40 nm. Therefore, the first magnetic layer 1 stacked on the land 17 is virtually separated at a level difference 18 between the guide groove 16 and the land 17. Additionally, in a practical operation, the first magnetic layer 1 is formed by using a sputtering method so that a magnetic film is formed on the level difference 18 as well; consequently, the first magnetic layer 1 is connected. However, the film thickness is extremely small so that it is possible to ignore a magnetic coupling occurring at the level difference 18. In the present invention, such a state is referred to as a magnetic separation between information tracks.

Figure 6:
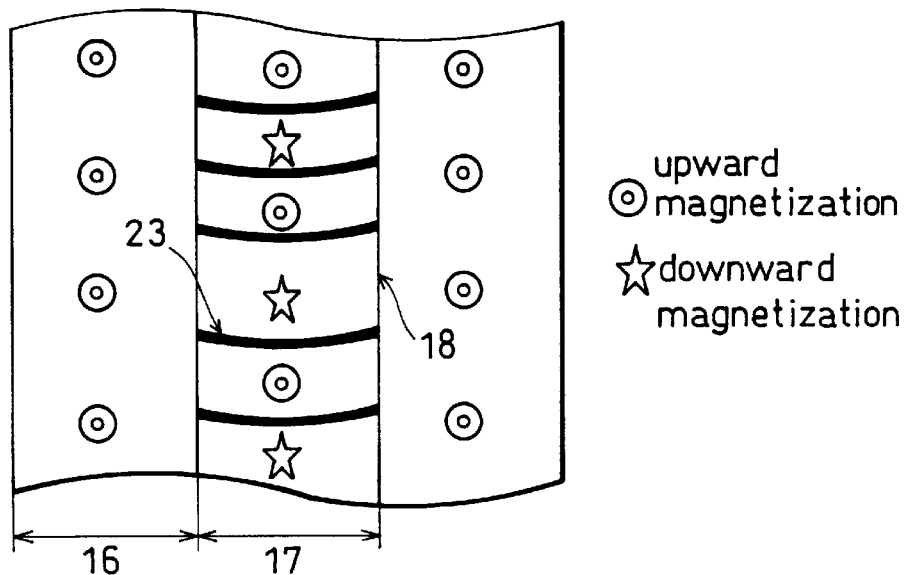
FIG. 6 is a plan view for explaining a domain wall of the magneto-optical disk illustrated in FIG. 5.

When a reverse domain is formed in a manner so as to fill a groove width, as shown in FIG. 6, a domain wall is not formed at a boundary portion of the domain in the level difference 18, and a domain wall 23, which is not closed, is formed at a boundary portion of the domain on the land 17. The unclosed domain wall 23 like this does not generate and erase a domain wall on the level difference 18 even when shifting in a track direction so as to readily shift.

As the transparent dielectric protecting layer 14, it is desirable to use a transparent dielectric made of a material selected from AlN, SiN, AlSiN, and $Ta_2O_3$, etc. The film thickness needs to be arranged so as to realize a favorable interference effect and increase a Kerr rotation angle of the medium, with regard to the incident light beam 4. Therefore, on the assumption that the wavelength of the light beam 4 is λ and the refractive index of the transparent dielectric protecting layer 14 is n, the film thickness of the transparent dielectric protecting layer 14 is set at approximately (λ/(4n)). For example, if the wavelength of the light beam 4 is 680 nm, the film thickness of the transparent dielectric protecting layer 14 can be set at approximately between 40 nm and 100 nm.

The first magnetic layer 1 is made of a perpendicularly magnetized film which has a smaller domain wall coercivity and a larger domain wall mobility as compared with the third magnetic layer 3 around the reproduction temperature. And, the first magnetic layer 1 has a lower Curie temperature than that of the third magnetic layer 3. Further, the composition is adjusted as follows: upon reproducing, the light beam 4 is irradiated so as to form an area 11 whose temperature increases to more than the Curie temperature in the first magnetic layer 1.

It is desirable to set a Curie temperature Tc1 of the first magnetic layer 1 at between 140° C. and 240° C. In the case of Tc1<140° C., the Kerr rotation angle considerably decreases in accordance with a reduction in the Curie temperature of the first magnetic layer 1, and the intensity of a reproduced signal is reduced so that it is not possible to obtain a favorable reproducing property. In the case of Tc1>240° C., it is necessary to increase the temperature of a part of the first magnetic layer 1 at least to more than 240° C. by irradiating the light beam 4 upon reproducing, so that there is a possibility that the third magnetic layer 3 may be heated to more than the Curie temperature due to fluctuations in temperature, etc. and recorded information may be erased; thus, a power margin for reproduction becomes extremely narrow.

Further, it is desirable to set the film thickness of the first magnetic layer 1 between 20 and 80 nm. If the film thickness of the first magnetic layer 1 becomes less than 20 nm, the amount of transmitted light increases so that a favorable masking effect cannot be obtained, and the intensity of the reproduced signal is reduced so as to cause degradation in the reproducing property. Furthermore, if the film thickness of the first magnetic layer 1 becomes larger than 80 nm, sensitivity for recording is considerably degraded due to the increase in a film thickness.

As the first magnetic layer 1, it is possible to adopt a perpendicularly magnetized film which is made of materials selected from: GdFe and GdFeD or GdFeCoD(D is made of one or more elements selected from Y, Ti, V, Cr, Pd, Cu, Si, and Al), and GdHRFe, GdHRFeCo, or GdHRFeCoD(HR is a heavy rare earth metal, and is made of one or more elements selected from Tb, Dy, Ho, and Er, and D is made of one or more elements selected from Y, Ti, V, Cr, Pd, Cu, Si, and Al), and GdLRFe, GdLRFeCo, or GdLRFeCoD(LR is a light rare earth metal, and is made of one or more elements selected from Ce, Pr, Nd, and Sm, and D is made of one or more elements selected from Y, Ti, V, Cr, Pd, Cu, Si, and Al).

The second magnetic layer 2 is made of a magnetic film, which is made of an alloy of rare earth metal transition metals. The Curie temperature is set lower than those of the first magnetic layer 1 and the third magnetic layer 3. It is desirable to set the Curie temperature Tc2 of the second magnetic layer 2 at between 40° C. and 140° C.

In the case of Tc2<40° C., the Curie temperature of the second magnetic layer 2 is reduced too much so that in a part whose temperature is not increased to the Curie temperature, it becomes difficult to maintain an exchange coupling between the first magnetic layer 1 and the third magnetic layer 3; consequently, quality of the reproduced signal is degraded. Further, in the case of Tc2>140° C., the first magnetic layer 1 and the third magnetic layer 3 are exchangeably coupled to each other even in a higher temperature range so that expansion of a domain becomes small; consequently, the intensity of the reproduced signal is reduced and quality of the signal is degraded.

Moreover, it is desirable to set the film thickness of the second magnetic layer 2 at between 2 nm and 80 nm. If the film thickness of the second magnetic layer 2 is reduced to less than 2 nm, in an area whose temperature increases to more than the Curie temperature in the second magnetic layer 2, it is not possible to interrupt the exchange coupling between the first magnetic layer 1 and the third magnetic layer 3, and the shift of the domain wall is prevented in the first magnetic layer 1 so that it becomes difficult to realize a stable expansion and reproduction of the domain. Further, if the film thickness of the second magnetic layer 2 exceeds 80 nm, the sensitivity for recording is considerably degraded due to the increase in the film thickness.

As the second magnetic layer 2, it is possible to adopt a perpendicularly magnetized film which is made of materials selected from: TbFe, TbFeCo, DyFe, DyFeCo, TbDyFe, TbDyFeCo, TbFeD, TbFeCoD, DyFeD, DyFeCoD, TbDyFeD, and TbDyFeCoD(D is made of one or more elements selected from Y, Ti, V, Cr, Pd, Cu, Si, and Al).

The third magnetic layer 3 is made of a perpendicularly magnetized film, which is made of an alloy of rare earth metal transition metals. The Curie temperature is set higher than those of the first magnetic layer 1 and the second magnetic layer 2. It is desirable to set the Curie temperature Tc3 of the third magnetic layer 3 at between 180° C. and 300° C.

In the case of Tc3<180° C., the Curie temperature of the third magnetic layer 3 is reduced too much so that upon reproducing, when the first magnetic layer 1 is heated to more than the Curie temperature, even a slight temperature increase heats the medium to more than the Curie temperature of the third magnetic layer 3. In this case, information recorded in the third magnetic layer 3 is erased, resulting in a considerable reduction in the power margin for reproduction.

In the case of Tc3>300° C., upon recording, it is necessary to heat the third magnetic layer 3 to more than 300° C. so that the sensitivity for recording is considerably degraded. At the same time, the first magnetic layer 1, the second magnetic layer 2, and the third magnetic layer 3 are heated to more than 300° C., resulting in a degradation in the magnetic property of each of the magnetic layers and degradation in quality of a generating signal upon erasing a record.

Furthermore, it is desirable to set the film thickness of the third magnetic layer 3 at between 5 nm and 80 nm. If the film thickness of the third magnetic layer 3 is reduced to less than 5 nm, it becomes difficult to record in a stable manner, and an increase in recording noise causes degradation in quality of the reproduced signal. Moreover, if the film thickness of the third magnetic layer 3 exceeds 80 nm, the sensitivity for recording is considerably degraded due to the increase in film thickness.

As the third magnetic layer 3 for achieving the above-mentioned magnetic property, it is possible to adopt a perpendicularly magnetized film which is made of materials selected from TbFe, TbFeCo, DyFe, DyFeCo, TbDyFe, and TbDyFeCo.

The protecting layer 15 is made of a transparent dielectric, which is made of materials selected from AlN, SiN, AlSiN, and $Ta_2O_3$, or made of an alloy of non-magnetic metals, which are made of metals selected from Al, Ti, Ta, and Ni. The protecting layer 15 is formed in order to prevent the alloy of rare earth metal transition metals, which are used for the first magnetic layer 1, the second magnetic layer 2, and the third magnetic layer 3, from being subjected to oxidization. The film thickness is preferably set at between 5 nm and 60 nm.

Additionally, with the arrangement of the protecting layer 15, a thermal dispersion metal layer, which is made of materials selected from Al, AlTa, AlTi, AlCr, AlNi, AlCo, and Cu, can be further added to the upper part of the protecting layer 15 so that it is possible to improve a thermal property of the medium. Further, in some cases, an ultraviolet cure resin, a heat cure resin, or a lubricant layer can be formed on the protecting layer 15 or the thermal dispersion metal layer.

Figure 7:
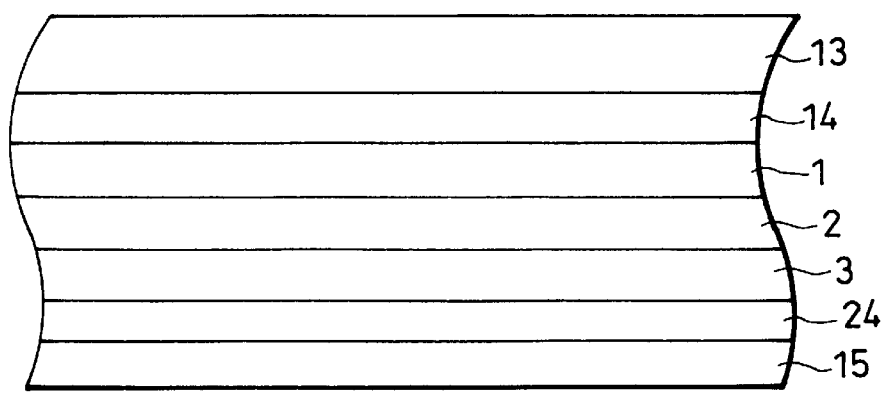
FIG. 7 is a sectional view showing a construction in which an auxiliary recording layer is further stacked on the magneto-optical disk of the first embodiment.

Moreover, as shown in FIG. 7, in order to record in a low magnetic field, it is also possible to stack and form a perpendicularly magnetized film such as an auxiliary recording layer 24 made of a perpendicularly magnetized film, which is made of materials selected from GdFeCo, GdTbFeCo, and GdDyFeCo. The perpendicularly magnetized film is in contact with the third magnetic layer 3 and has a smaller coercivity and a higher Curie temperature as compared with the third magnetic layer 3.

Moreover, the auxiliary recording layer makes it possible to realize a recording in a low magnetic field for the following reason: the recording layer is heated to around or more than the Curie temperature, and the magnetization direction of the recording layer is directed to the recording magnetization, so as to realize a recording in the magneto-optical recording medium. However, the recording layer has a small magnetization around the Curie temperature so that the magnetostatic coupling is reduced between the recording magnetic field and the recording layer; consequently, it is necessary to provide a relatively large recording magnetic field in order to align the magnetization of the recording layer to the direction of the recording magnetic field. For this reason, the auxiliary recording layer, which has a higher Curie temperature than the recording layer, is stacked so as to increase the magnetostatic coupling between the auxiliary recording layer and the recording layer. Furthermore, the auxiliary recording layer has a relatively small coercivity so that it is possible to align the magnetization direction of the auxiliary recording layer to the direction of the recording magnetic field even in a lower recording magnetic field. As described above, the magnetization of the auxiliary recording layer, that is aligned to the direction of the recording magnetic field in a lower recording magnetic field, is transferred to the recording layer by an exchange coupling so that it is possible to record in a low magnetic field.

The following explanation describes examples of a forming method of the magneto-optical disk having the above-mentioned construction, and a method for reproducing a record.

EXAMPLE 1

(1) A Forming Method of the Magneto-optical Disk.

The following explanation describes a forming method of the magneto-optical disk having the above-mentioned construction.

Firstly, in a sputtering device which is provided with an Al target, a GdFeSi alloy target, a TbFeCo alloy target, and a DyFe alloy target, a substrate 13 made of a polycarbonate, that includes a guide groove having a depth of 100 nm and is formed into a disk, is disposed.

Further, after the inside of the sputtering device has been evacuated to $1 \times 10^{-6}$ Torr, a mixed gas of argon and nitrogen is filled therein, electricity is applied to the Al target so as to form a transparent dielectric protecting layer 14 made of AlN on the substrate 13 with a thickness of 80 nm, under the condition of a gas pressure of $4 \times 10^{-3}$ Torr.

Next, after the inside of the sputtering device has been evacuated to $1 \times 10^{-6}$ Torr again, a gas of argon is filled therein, electricity is applied to the GdFeSi alloy target so as to form a first magnetic layer 1 made of $(Gd_{0.27}Fe_{0.73})_{0.85}Si_{0.15}$ on the transparent dielectric protecting layer 14 with a film thickness of 40 nm, under the condition of a gas pressure of $4 \times 10^{-3}$ Torr. The first magnetic layer 1 is a perpendicularly magnetized film with a compensation temperature of 140° C. and a Curie temperature of 180° C.

And then, successively, electricity is applied to the DyFe alloy target so as to form a second magnetic layer 2 made of $Dy_{0.25}Fe_{0.74}$ on the first magnetic layer 1 with a film thickness of 10 nm, under the condition of a gas pressure of $4 \times 10^{-3}$ Torr. The second magnetic layer 2 is a perpendicularly magnetized film with a compensation temperature of 40° C. and a Curie temperature of 80° C.

And then, successively, electricity is applied to the TbFeCo alloy target so as to form a third magnetic layer 3 made of $Tb_{0.27}(Fe_{0.88}Co_{0.12})_{0.73}$ on the second magnetic layer 2 with a film thickness of 30 nm, under the condition of a gas pressure of $4 \times 10^{-3}$ Torr. The third magnetic layer 3 is a perpendicularly magnetized film with a compensation temperature of 160° C. and a Curie temperature of 260° C.

Next, a mixed gas of argon and nitrogen is filled therein, electricity is applied to the Al target so as to form a protection layer 15 made of AlN on the third magnetic layer 3 with a film thickness of 20 nm, under the condition of a gas pressure of $4 \times 10^{-3}$ Torr.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m so that repeated patterns of upward magnetization and downward magnetization are formed on the third magnetic layer 3 in accordance with the direction of the recording magnetic field, under a continuous irradiation of a recording/reproducing laser of 6 mW. Further, a modulation frequency is changed on the recording magnetic field so that a domain pattern having a mark length between 0.1 and 0.5 µm is recorded. Here, the mark length means that the recording domain whose length corresponds to the mark length is formed with a pitch which is twice as long as the mark length.

Figure 8:
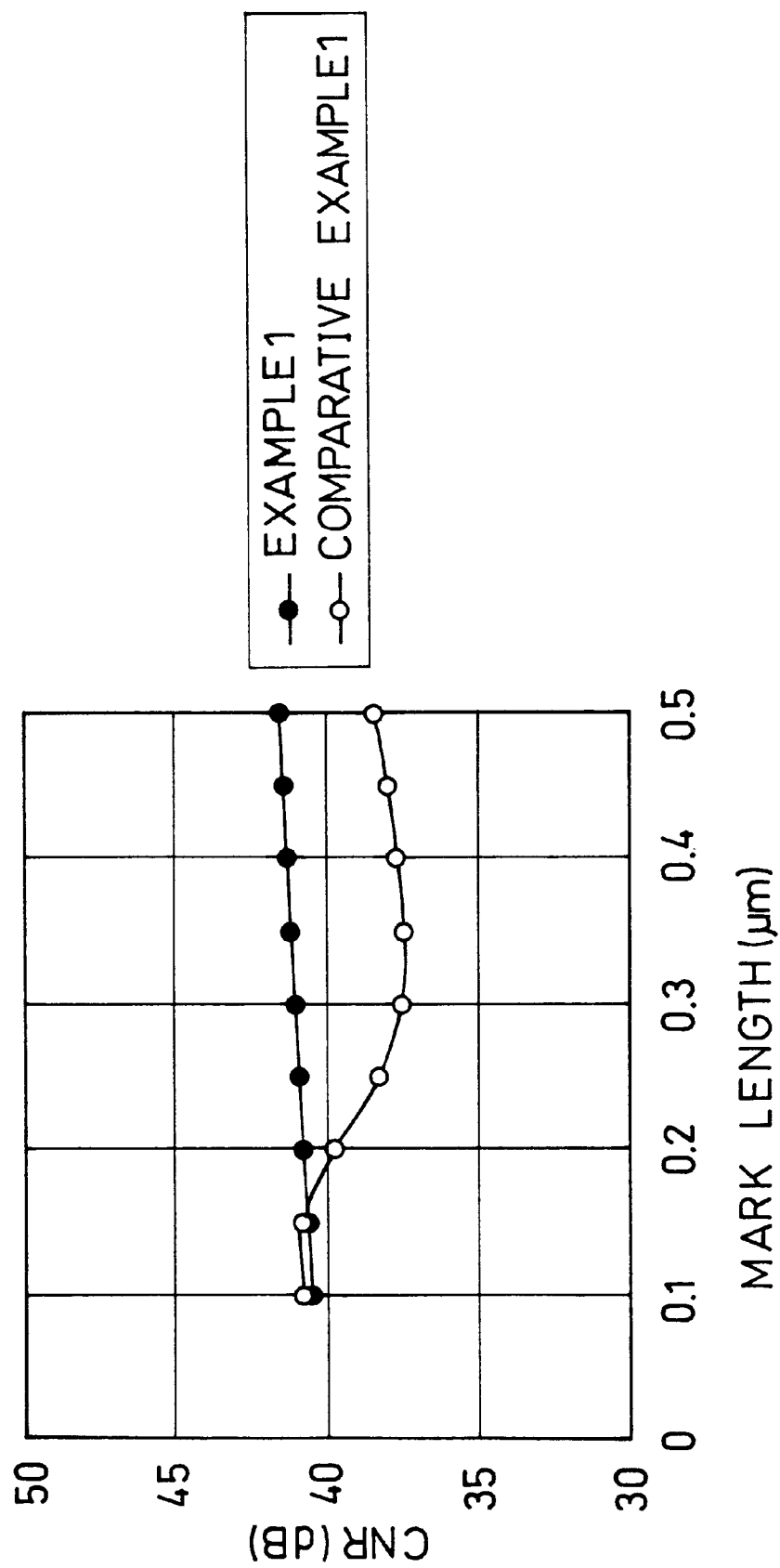
FIG. 8 is a graph showing dependence on a mark length with regard to a CNR of the magneto-optical disk of the example 1.

Next, with regard to a CNR(Carrier to Noise Ratio), a dependence on the mark length is measured under a continuous irradiation of the recording/reproducing laser of 1.5 mW. FIG. 8 shows the result of the example 1. Further, for comparison, FIG. 8 shows a CNR of a magneto-optical disk of the example 1 that adopts GdFeCo having the Curie temperature of 280° C. as the first magnetic layer 1, as a comparative example 1.

In a comparison of the example 1 and the comparative example 1, both of them are able to obtain the CNRs of 40 dB or more as long as the mark length is not more than 0.15 μm; however, the CNR of the comparative example 1 sharply decreases at the mark length of more than 0.15 μm. This is because, in the comparative example 1, due to an increase in the mark length, a domain wall shifts from the rear end so as to expand a domain, and the domain expanded from the rear end is simultaneously reproduced with a domain which is expanded when a domain wall shifts from the frond end, so that a reproduced noise increases.

Meanwhile, in the example 1, the domain wall shifted from the rear end stops at a portion whose temperature increases to more than the Curie temperature in the first magnetic layer 1 so that the expanded domain, which is caused by the domain wall shifted from the rear end, does not enter the spot of the light beam; therefore, even when the mark length is more than 0.15 μm, any reduction in the CNR is not found at all. As described above, it is confirmed that the magneto-optical recording medium of the example 1 makes it possible to reproduce merely the domain expanded at the front end without causing a repetition of reproduction so as to be adoptable to a mark edge recording.

The above-mentioned explanation describes the result of study on the recording and reproducing property, on the assumption that a perpendicularly magnetized film made of $(Gd_{0.27}Fe_{0.73})_{0.85}Si_{0.15}$ with a compensation temperature of 140° C. and the Curie temperature of 180° C. is used as the first magnetic layer 1, a perpendicularly magnetized film made of $Dy_{0.25}Fe_{0.75}$ with a compensation temperature of 40° C. and the Curie temperature of 80° C. is used as the second magnetic layer 2, and a perpendicularly magnetized film made of $Tb_{0.27}(Fe_{0.88}Co_{0.12})_{0.73}$ with a compensation temperature of 160° C. and the Curie temperature of 260° C. is used as the third magnetic layer 3. However, it is possible to adopt a magnetic layer having another magnetic property.

The following explanation describes a recording and reproducing property with regard to another example in which a magnetic property varies for each of the magnetic layers.

EXAMPLE 2

With regard to a magneto-optical recording medium of the example 1, a merely magnetic property of a first magnetic layer 1 is allowed to vary in accordance with a composition adjustment so as to form a magneto-optical disk, and then the recording and reproducing property is studied. Table 1 shows a result of measuring a CNR for a 0.1 μm mark length in the case when a composition, a compensation temperature, and a Curie temperature of the first magnetic layer 1 vary. Additionally, the measurement is carried out by adjusting the reproducing power for each disk in order to prevent a reduction of the CNR at the mark length of 0.3 μm, namely, to prevent a repetition of reproduction caused by a domain wall shifting from the rear end.

TABLE 1

| DISK | COMPOSITION OF THE FIRST MAGNETIC LAYER | COMPENSATION TEMPERATURE (° C.) | Curie TEMPERATURE (° C.) | CNR |
| --- | --- | --- | --- | --- |
| NO. 1-1 | $Gd_{0.27}(Fe_{0.95}Co_{0.05})_{0.73}$ | 140 | 260 | 10.0dB |
| NO. 1-2 | $Gd_{0.27}Fe_{0.73}$ | 140 | 240 | 41.0dB |
| NO. 1-3 | $(Gd_{0.27}Fe_{0.73})_{0.95}Si_{0.05}$ | 140 | 220 | 40.8dB |
| NO. 1-4 | $(Gd_{0.27}Fe_{0.73})_{0.90}Si_{0.10}$ | 140 | 200 | 40.9dB |
| NO. 1-5 | $(Gd_{0.27}Fe_{0.73})_{0.85}Si_{0.15}$ | 140 | 180 | 40.8dB |
| NO. 1-6 | $(Gd_{0.27}Fe_{0.73})_{0.80}Si_{0.20}$ | 140 | 160 | 40.5dB |
| NO. 1-7 | $(Gd_{0.27}Fe_{0.73})_{0.75}Si_{0.25}$ | 140 | 140 | 39.0dB |
| NO. 1-8 | $(Gd_{0.27}Fe_{0.73})_{0.70}Si_{0.30}$ | NE | 120 | 30.0dB |
| NO. 1-9 | $(Gd_{0.33}Fe_{0.67})_{0.85}Si_{0.15}$ | NE | 165 | 33.2dB |
| NO. 1-10 | $(Gd_{0.31}Fe_{0.69})_{0.85}Si_{0.15}$ | NE | 171 | 40.0dB |
| NO. 1-11 | $(Gd_{0.29}Fe_{0.71})_{0.85}Si_{0.15}$ | 170 | 177 | 40.5dB |
| NO. 1-12 | $(Gd_{0.27}Fe_{0.73})_{0.85}Si_{0.15}$ | 140 | 180 | 40.8dB |
| NO. 1-13 | $(Gd_{0.25}Fe_{0.75})_{0.85}Si_{0.15}$ | 80 | 184 | 40.8dB |
| NO. 1-14 | $(Gd_{0.23}Fe_{0.77})_{0.85}Si_{0.15}$ | 20 | 189 | 40.6dB |
| NO. 1-15 | $(Gd_{0.20}Fe_{0.80})_{0.85}Si_{0.15}$ | -60 | 192 | 40.2dB |
| NO. 1-16 | $(Gd_{0.17}Fe_{0.83})_{0.85}Si_{0.15}$ | -140 | 199 | 31.0dB |

For the disk No.1-1, GdFeCo is adopted as the first magnetic layer whose Curie temperature, 260° C., is extremely high, and the temperature of a third magnetic layer 3 partially increases to more than the Curie temperature so that a part of recorded information is erased; thus, it is not possible to obtain a favorable reproduced signal, and merely an extremely low CNR can be obtained.

The disks No.1-2 through 1-8 indicate that the CNR is measured when GdFe contains Si so as to vary the Curie temperature of the first magnetic layer 1. As indicated by the disk No. 1-2, in the case when GdFe is adopted as the first magnetic layer 1, the Curie temperature, 240° C., is extremely close to that of the third magnetic layer 3 so that a power margin for reproduction becomes narrow; however, a favorable CNR can be obtained. Further, with regard to the disk No. 1-8 which contains 30% Si, the Curie temperature is reduced to 120° C., a Kerr rotation angle of the first magnetic layer 1 becomes smaller, and the expansion of a domain also becomes smaller; thus, the intensity of the reproduced signal sharply declines, and the CNR becomes extremely low.

According to the above-mentioned result, it is understood that the Curie temperature of the first magnetic layer 1 needs to be set at between 140° C. and 240° C.

Next, the disks No. 1-9 through 1-16 indicate the CNR which is measured when the percentage of Si is kept at 15%, a ratio of Gd and Fe is changed, and the compensation temperature of the first magnetic layer 1 is also changed. In the table 1, "NE" means that no compensation temperature exists.

It is understood that a favorable CNR can be obtained with regard to the disks No.1-10 through 1-15; meanwhile, the CNRs of the disks No.1-9 and No.1-16 are extremely low. This is because the compensation temperature of the first magnetic layer 1 is apart from the reproducing temperature; thus, total magnetization of the first magnetic layer 1 becomes larger, and the first magnetic layer 1 is magnetostatically coupled to a leakage flux appearing in the third magnetic layer 3 so as to prevent a domain wall from shifting on an area whose temperature increases to more than the Curie temperature in the second magnetic layer 2, resulting in an increase in the noise level.

Here, the first magnetic layer 1 of the disk No. 1-9 enters a state of in-plane magnetization at room temperature and a state of perpendicular magnetization at 80° C., due to an increase in the total magnetization. Until the temperature reaches the Curie temperature, 165° C., unlike the compensation composition in which magnetic moment of a rare-earth metal(RE) and magnetic moment of a transition metal (TE) balance each other, the first magnetic layer 1 of the disk No.1-9 has a magnetic film of a RErich composition, in which the magnetic moment of the rare-earth metal(RE) is normally larger.

The disk No. 1-10 has smaller total magnetization as compared with the disk No. 1-9 so as to normally enter a state of perpendicular magnetization at a temperature ranging from 25° C. to the Curie temperature, 171° C. Further, the disk No. 1-10 has a magnetic film of a RErich composition.

By comparison of the CNRs of No. 1-9 and No. 1-10, it is understood that the first magnetic layer 1 is preferably in a state of perpendicular magnetization when the compensation temperature is at 25° C. or more and the first magnetic layer 1 preferably has the RErich composition until the temperature of the first magnetic layer 1 reaches the Curie temperature. Further, by comparison of the CNRs of No. 1-15 and No. 1-16, it is understood that with regard to the first magnetic layer 1, the compensation temperature is preferably set at −60° C. or more.

EXAMPLE 3

With regard to a magneto-optical recording medium of the example 1, a merely magnetic property of a second magnetic layer 2 is allowed to vary in accordance with a composition adjustment so as to form a magneto-optical disk, and then the recording and reproducing property is studied. Table 2 shows a result of measuring a CNR for a 0.1 μm mark length in the case when a composition, a compensation temperature, and a Curie temperature vary in the second magnetic layer 2. Additionally, the measurement is carried out by adjusting the reproducing power for each disk in order to prevent a reduction in the CNR at the mark length of 0.3 μm, namely, to prevent a repetition of reproduction caused by a domain wall shifting from the rear end.

TABLE 2

| DISK | COMPOSITION OF THE SECOND MAGNETIC LAYER | COMPENSATION TEMPERATURE (° C.) | Curie TEMPERATURE (° C.) | CNR (dB) |
| --- | --- | --- | --- | --- |
| NO. 2–1 | $Tb_{0.25}(Fe_{0.95}Co_{0.05})_{0.70}$ | 40 | 165 | 15.0 |
| NO. 2–2 | $Tb_{0.25}Fe_{0.75}$ | 40 | 140 | 39.5 |
| NO. 2–3 | $(Tb_{0.25}Fe_{0.75})_{0.95}Si_{0.05}$ | 40 | 115 | 40.2 |
| NO. 2–4 | $(Tb_{0.25}Fe_{0.75})_{0.90}Si_{0.10}$ | 40 | 100 | 40.5 |
| NO. 2–5 | $(Tb_{0.25}Fe_{0.75})_{0.85}Si_{0.15}$ | 40 | 80 | 40.8 |
| NO. 2–6 | $(Tb_{0.25}Fe_{0.75})_{0.80}Si_{0.20}$ | 40 | 55 | 40.5 |
| NO. 2–7 | $(Tb_{0.25}Fe_{0.75})_{0.75}Si_{0.25}$ | NE | 40 | 39.0 |
| NO. 2–8 | $(Tb_{0.25}Fe_{0.75})_{0.70}Si_{0.30}$ | NE | 25 | 10.5 |

Here, a ratio of a rare-earth metal and a transition metal is kept at a certain ratio in the second magnetic layer 2 so that the compensation temperature of the second magnetic layer 2 is normally kept at 40° C. Further, "NE" of the column of the compensation temperature means that no compensation temperature exists due to a decrease in the Curie temperature. Moreover, the Curie temperature of the second magnetic layer 2 is adjusted by including a material selected from Co and Si.

With regard to the disks No. 2-2 through 2-7, favorable CNRs are obtained. It is found that a domain is expanded and reproduced in the first layer 1 without causing any problems.

With regard to the disk No.2-1, a difference between the Curie temperatures of the second magnetic layer 2 and the first magnetic layer 1 is small. The Curie temperature of the second magnetic layer 2 is extremely high, 165° C., and the Curie temperature of the first magnetic layer 1 is 180° C. Therefore, few regions are allowed to expand a domain so that any effects of expanding and reproducing a domain are not offered at all; thus, the CNR is reduced. For this reason, it is understood that the Curie temperature of the second magnetic layer 2 is preferably set at not more than 140° C. Therefore, when the first magnetic layer 1 has a Curie temperature(180° C.) of Tc1 and the second magnetic layer 2 has a Curie temperature of Tc2, it is desirable that Tc1 and Tc2 satisfy the following relationship:

$$Tc2 \leq Tc1-40° C.$$

Moreover, the Curie temperature of the disk No.2-8 is extremely low, 25° C., resulting in an unstable exchange coupling of the first magnetic layer 1 and the third magnetic layer 3, and a domain is not stably expanded and reproduced at an ambient temperature so that the CNR is reduced. For this reason, it is understood that the Curie temperature of the second magnetic layer 2 is preferably set at 40° C. or more.

EXAMPLE 4

With regard to a magneto-optical recording medium of the example 1, a merely magnetic property of a third magnetic layer 3 is allowed to vary in accordance with a composition adjustment so as to form a magneto-optical disk, and then the recording and reproducing property is studied. Table 3 shows a result of measuring a CNR for a 0.1 μm mark length in the case when a composition, a compensation temperature, and a Curie temperature vary in the third magnetic layer 3. Additionally, for an optimal recording, the measurement is carried out by adjusting the reproducing power for each disk so as to prevent a reduction in the CNR at the mark length of 0.3 μm, namely, to prevent a repetition of reproduction caused by a domain wall shifting from the rear end.

netic layer 3 is erased, resulting in degradation in the CNR. For this reason, in the case when the first magnetic layer 1 has a Curie temperature of Tc1 and the third magnetic layer 3 has a Curie temperature of Tc3, it is desirable that Tc1 and Tc3 satisfy at least the following relationship:

$$Tc1 < Tc3.$$

Next, with regard to the disks No.3-7 through 3-12, the contents of Fe and Co are kept at certain percentages and the ratio of the rare-earth metal content and the transition metal content varies so as to change the compensation temperature. The compensation temperature "NE" of the disk No.3-7 means that no compensation temperature exists and a RErich composition is maintained until the temperature reaches the Curie temperature.

The CNRs of the disks No.3-7 and No.3-12 are extremely low. This is because the compensation temperature of the

TABLE 3

| DISK | COMPOSITION OF THE THIRD MAGNETIC LAYER | COMPENSATION TEMPERATURE (° C.) | Curie TEMPERATURE (° C.) | CNR |
|---|---|---|---|---|
| NO. 3–1 | $Tb_{0.27}(Fe_{0.75}Co_{0.25})_{0.73}$ | 160 | 325 | 41.0dB |
| NO. 3–2 | $Tb_{0.27}(Fe_{0.79}Co_{0.21})_{0.73}$ | 160 | 300 | 41.0dB |
| NO. 3–3 | $Tb_{0.27}(Fe_{0.83}Co_{0.17})_{0.73}$ | 160 | 285 | 40.8dB |
| NO. 3–4 | $Tb_{0.27}(Fe_{0.88}Co_{0.12})_{0.73}$ | 160 | 260 | 40.8dB |
| NO. 3–5 | $Tb_{0.27}(Fe_{0.94}Co_{0.06})_{0.73}$ | 160 | 205 | 40.7dB |
| NO. 3–6 | $Tb_{0.27}Fe_{0.73}$ | 160 | 180 | 10.0dB |
| NO. 3–7 | $Tb_{0.32}(Fe_{0.88}Co_{0.12})_{0.68}$ | NE | 245 | 32.0dB |
| NO. 3–8 | $Tb_{0.29}(Fe_{0.88}Co_{0.12})_{0.71}$ | 250 | 255 | 40.1dB |
| NO. 3–9 | $Tb_{0.27}(Fe_{0.88}Co_{0.12})_{0.73}$ | 160 | 260 | 40.8dB |
| NO. 3–10 | $Tb_{0.24}(Fe_{0.88}Co_{0.12})_{0.78}$ | 50 | 265 | 40.0dB |
| NO. 3–11 | $Tb_{0.21}(Fe_{0.88}Co_{0.12})_{0.79}$ | −40 | 275 | 39.3dB |
| NO. 3–12 | $Tb_{0.28}(Fe_{0.88}Co_{0.12})_{0.82}$ | −120 | 280 | 29.2dB |

With regard to the disks No. 3-1 through No. 3-6, a ratio of a rare-earth metal and a transition metal is kept at a certain ratio in the third magnetic layer 3, and a ratio of Fe and Co varies so as to change a Curie temperature with a fixed compensation temperature of 160° C.

In the disk No.3-1, a high CNR of 41 dB is obtained; however, when a measurement is carried out again after a record has been erased 10,000 times, a CNR of merely 20 dB is obtained. This is because the third magnetic layer 3 of the disk No.3-1 has a high Curie temperature of 325° C. and the temperature of each magnetic layer increases to at least 325° C. due to the erasing of records, resulting in degradation in a magnetic property of each of the magnetic layers. In contrast, with regard to the disk No.3-2 in which the third magnetic layer 3 has a Curie temperature of 300° C., the same CNR can be obtained even after a record has been erased 10,000 times. For this reason, it is understood that the Curie temperature of the third magnetic layer 3 is preferably set at not more than 300° C.

Further, the disk No. 3-6 has a small CNR. This is because the third magnetic layer 3 has a small Curie temperature of 180° C. Namely, in the magneto-optical recording medium of the present invention, at least a part of the first magnetic layer 1 needs to increase the temperature to more than the Curie temperature upon reproducing. Here, the Curie temperature of the first magnetic layer 1 is 180° C. so that the temperature of a part of the third magnetic layer 3 also rises to more than the Curie temperature upon reproducing. Therefore, a part of information recorded in the third magthird magnetic layer 3 is apart from the reproducing temperature so that total magnetization of the third magnetic layer 3 becomes larger; accordingly, a leakage flux appearing in the third magnetic layer 3 becomes larger so as to prevent a domain wall from shifting in the first magnetic layer, resulting in a noise increase of the reproduced signal and a degradation in the CNR.

For this reason, in the case when the third magnetic layer 3 has a compensation temperature of Tcomp3 and a Curie temperature of Tc3, it is desirable that Tcomp3 and Tc3 satisfy the following relationship:

$$-40° C. \leq Tcomp3 < Tc3.$$

[Second Embodiment]

Figure 9:
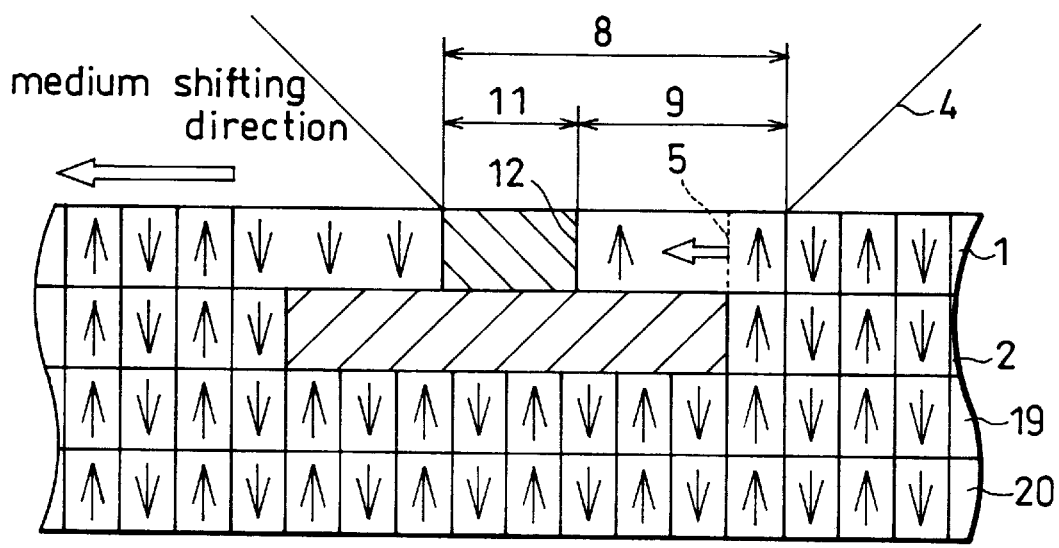
FIG. 9 is a sectional model drawing for explaining a principle of reproduction of a magneto-optical disk of the second embodiment.

The following explanation describes the detail of a magneto-optical recording medium in accordance with the present embodiment. In the first embodiment, a magnetic property of a third magnetic layer 3 is adjusted and a leakage flux appearing in the third magnetic layer 3 is reduced so as to realize a smooth shift of a domain wall in a first magnetic layer 1. Meanwhile, in the present embodiment, as shown in FIG. 9, a fourth magnetic layer 19 and a fifth magnetic layer 20, whose magnetic polarities are different from each other, are stacked instead of the third magnetic layer 3. The fourth magnetic layer 19 and the fifth magnetic layer 20 form a recording layer. With this arrangement, it is possible to reduce a leakage flux appearing in the fourth magnetic layer 19 and the fifth magnetic layer 20 and to realize a smooth shift of a domain wall in the first magnetic layer 1.

Figure 10:
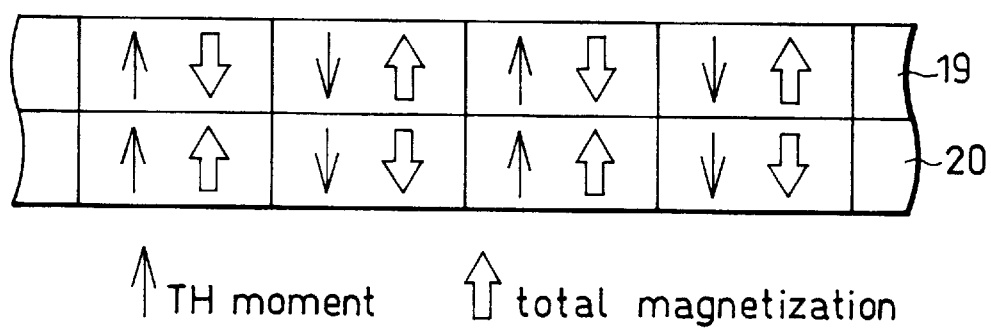
FIG. 10 is a sectional model drawing for explaining a magnetic property of the magneto-optical disk illustrated in FIG. 9.

FIG. 10 is an expanded sectional view showing merely the fourth magnetic layer 19 and the fifth magnetic layer 20 of FIG. 9. Referring to FIG. 10, the following explanation describes a state in which a leakage flux is reduced. In FIG. 10, the fourth magnetic layer 19 is made of a perpendicularly magnetized film which continuously maintains a RErich composition from room temperature to the Curie temperature, and the TM moment and total magnetization are arranged in parallel in the opposite direction from each other. Meanwhile, the fifth magnetic layer 20 is made of a perpendicularly magnetized film which continuously maintains a TMrich composition from room temperature and to the Curie temperature, and the TM moment and total magnetization are arranged in parallel in the same direction from each other.

Here, the fourth magnetic layer 19 is stacked on the fifth magnetic layer 20 so that an exchange coupling force allows the TM moment directions of both layers to be aligned in parallel in the same direction. In this case, the total magnetization of the fourth magnetic layer 19 and the total magnetization of the fifth magnetic layer 20 are arranged in parallel in the opposite direction from each other. The entire amount of the total magnetization of the layers serves as a leakage flux appearing in the fourth magnetic layer 19 and the fifth magnetic layer 20. Since the total magnetization of the fourth magnetic layer 19 and the total magnetization of the fifth magnetic layer 20 cancel each other, it is possible to realize a state in which little leakage flux exists and to realize a smooth shift of a domain wall in the first magnetic layer 1.

Next, referring to figures, the following explanation describes a case in which a magneto-optical disk, which uses the magneto-optical recording medium of the second embodiment of the present invention, is adopted.

Figure 11:
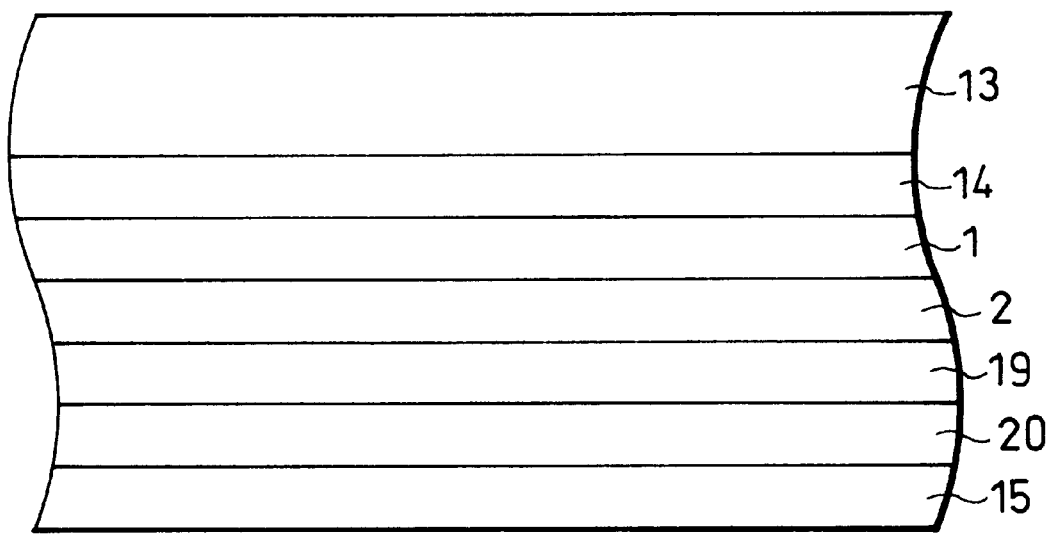
FIG. 11 is a sectional view showing a construction of a magneto-optical disk of the second embodiment.

As shown in FIG. 11, the magneto-optical medium of the present embodiment has a construction in which a transparent dielectric protecting layer 14, the first magnetic layer 1, a second magnetic layer 2, the fourth magnetic layer 19, the fifth magnetic layer 20, and a protecting layer 15 are successively formed on a magneto-optical disk substrate 13.

Further, with regard to the substrate 13, the transparent dielectric protecting layer 14, the first magnetic layer 1, the second magnetic layer 2, and the protecting layer 15 of the second embodiment, it is possible to adopt the same materials described in the first embodiment.

The fourth magnetic layer 19 and the fifth magnetic layer 20 are perpendicularly magnetized films made of alloys of rare-earth transition metals, and the Curie temperatures of those layers are set higher than those of the first magnetic layer 1 and the second magnetic layer 2. Further, in order to reduce a leakage flux, the fourth magnetic layer 19 and the fifth magnetic layer 20 have different magnetic polarities from each other.

Namely, in the case when a perpendicularly magnetized film having a RErich composition made of an alloy of rare-earth transition metals is adopted as the fourth magnetic layer 19, it is necessary to adopt a perpendicularly magnetized film having a TMrich composition made of an alloy of rare-earth transition metals as the fifth magnetic layer 20; meanwhile, in the case when a perpendicularly magnetized film having a TMrich composition made of an alloy of rare-earth transition metals is adopted as the fourth magnetic layer 19, it is necessary to adopt a perpendicularly magnetized film having a RErich composition made of an alloy of rare-earth transition metals as the fifth magnetic layer 20.

Moreover, in order to effectively reduce the leakage flux, it is desirable to set the Curie temperatures of the fourth magnetic layer 19 and the fifth magnetic layer 20 at virtually the same temperature. Here, it is desirable to set Curie temperatures Tc4 and Tc5 of the fourth magnetic layer 19 and the fifth magnetic layer 20 at between 180° C. and 300° C.

If the Tc4 and the Tc5 are less than 180° C., the Curie temperatures of the fourth magnetic layer 19 and the fifth magnetic layer 20 become too low. Therefore, upon reproducing, when the first magnetic layer 1 is heated at more than the Curie temperature, a slight increase in temperature allows the medium to be heated to more than the Curie temperatures of the fourth magnetic layer 19 and the fifth magnetic layer 20 so that recorded information is erased and a power margin for reproduction becomes extremely narrow.

Further, if the Tc4 and Tc5 exceed 300° C., it is necessary to heat the fourth magnetic layer 19 and the fifth magnetic layer 20 at 300° C. or more for recording, resulting in considerable degradation in sensitivity for recording. At the same time, the first magnetic layer 1, the second magnetic layer 2, the fourth magnetic layer 19, and the fifth magnetic layer 20 are heated at 300° C. or more, resulting in degradation in a magnetic property of each of the layers and degradation in a reproduced signal upon erasing records.

Moreover, it is desirable to set a total film thickness of the fourth magnetic layer 19 and the fifth magnetic layer 20 at between 10 nm and 80 nm. If the total film thickness is less than 10 nm, it becomes difficult to record in a stable manner, a record noise increases, and quality of a reproduced signal is degraded. Additionally, if the total film thickness exceeds 80 nm, sensitivity for recording is considerably degraded due to an increase in the film thickness.

As the fourth magnetic layer 19 and the fifth magnetic layer 20, it is possible to adopt perpendicularly magnetized films made of materials selected from TbFe, TbFeCo, DyFe, DyFeCo, TbDyFe, and TbDyFeCo.

Further, in the present embodiment, it is merely necessary to arrange a magnetic polarity of the fourth magnetic layer 19 which is different from that of the fifth magnetic layer 20. The fourth magnetic layer 19 and the fifth magnetic layer 20 are allowed to be formed in a reversed procedure described in FIG. 11.

Moreover, in the above-mentioned arrangement, a thermal diffusion metal layer made of materials selected from Al, AlTa, AlTi, AlCr, AlNi, AlCo, and Cu, etc. is added on the protecting layer 15 so that it is possible to improve a thermal property of the medium. Further, in some cases, it is possible to form an ultraviolet cure resin, a thermosetting resin, or a lubricating layer on the protecting layer 15 or the thermal diffusion metal layer.

Additionally, in order to record in a lower magnetic field, it is possible to stack an auxiliary recording layer being contact with one of the fourth magnetic layer 19 and the fifth magnetic layer 20 that has a higher Curie temperature than the other. The auxiliary recording layer has a smaller coercivity and a higher Curie temperature as compared with the layer. As the auxiliary recording layer, for example, it is possible to adopt a perpendicularly magnetized film made of materials selected from GdFeCo, GdTbFeCo, and GdDyFeCo.

Next, the following explanation describes an example of a forming method and a recording and reproducing method of the magneto-optical disk which has the above-mentioned arrangement.

EXAMPLE 5

(1) Forming Method of a Magneto-optical Disk

Firstly, in the same manner as the example 1, a transparent dielectric protecting layer 14 made of AlN with a film thickness of 80 nm, a first magnetic layer 1 made of $(Gd_{0.27}Fe_{0.73})_{0.85}Si_{0.15}$ with a film thickness of 40 nm, and a second magnetic layer 2 made of $Dy_{0.25}Fe_{0.75}$ with a film thickness of 10 nm are formed on a substrate 13.

Next, electricity is applied to a first alloy target of TbFeCo, and under the condition of gas pressure of $4\times10^{-3}$ Torr, a fourth magnetic layer 19 made of $Tb_{0.20}(Fe_{0.90}Co_{0.10})_{0.80}$ is formed on the second magnetic layer 2 with a film thickness of 15 nm. The fourth magnetic layer 19 is a perpendicularly magnetized film which has a coercivity of 640 kA/m at room temperature and a Curie temperature of 270° C., and which continuously maintains a TMrich composition from room temperature to the Curie temperature(270° C.).

Successively, electricity is applied to a second alloy target of TbFeCo, and under the condition of gas pressure of $4\times10^{-3}$ Torr, a fifth magnetic layer 20 made of $Tb_{0.30}(Fe_{0.87}Co_{0.13})_{0.70}$ is formed on the fourth magnetic layer 19 with a film thickness of 15 nm. The fifth magnetic layer 20 is a perpendicularly magnetized film which has a coercivity of 400 kA/m at room temperature and a Curie temperature of 255° C., and which continuously maintains a RErich composition from room temperature to the Curie temperature(255° C.).

Next, in the same manner as the example 1, a protecting layer 15 made of AlN is formed on the fifth magnetic layer 20 with a film thickness of 20 nm.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m so that repeated patterns of upward magnetization and downward magnetization are formed on the fourth magnetic layer 19 and the fifth magnetic layer 20 in accordance with the direction of the recording magnetic field, under a continuous irradiation of a recording/reproducing laser of 6.5 mW. A modulation frequency is changed in the recording magnetic field so that a domain pattern having a mark length between 0.1 and 0.5 μm is recorded. Here, the mark length means that the recording domain whose length corresponds to the mark length is formed with a pitch which is twice as long as the mark length.

Figure 12:
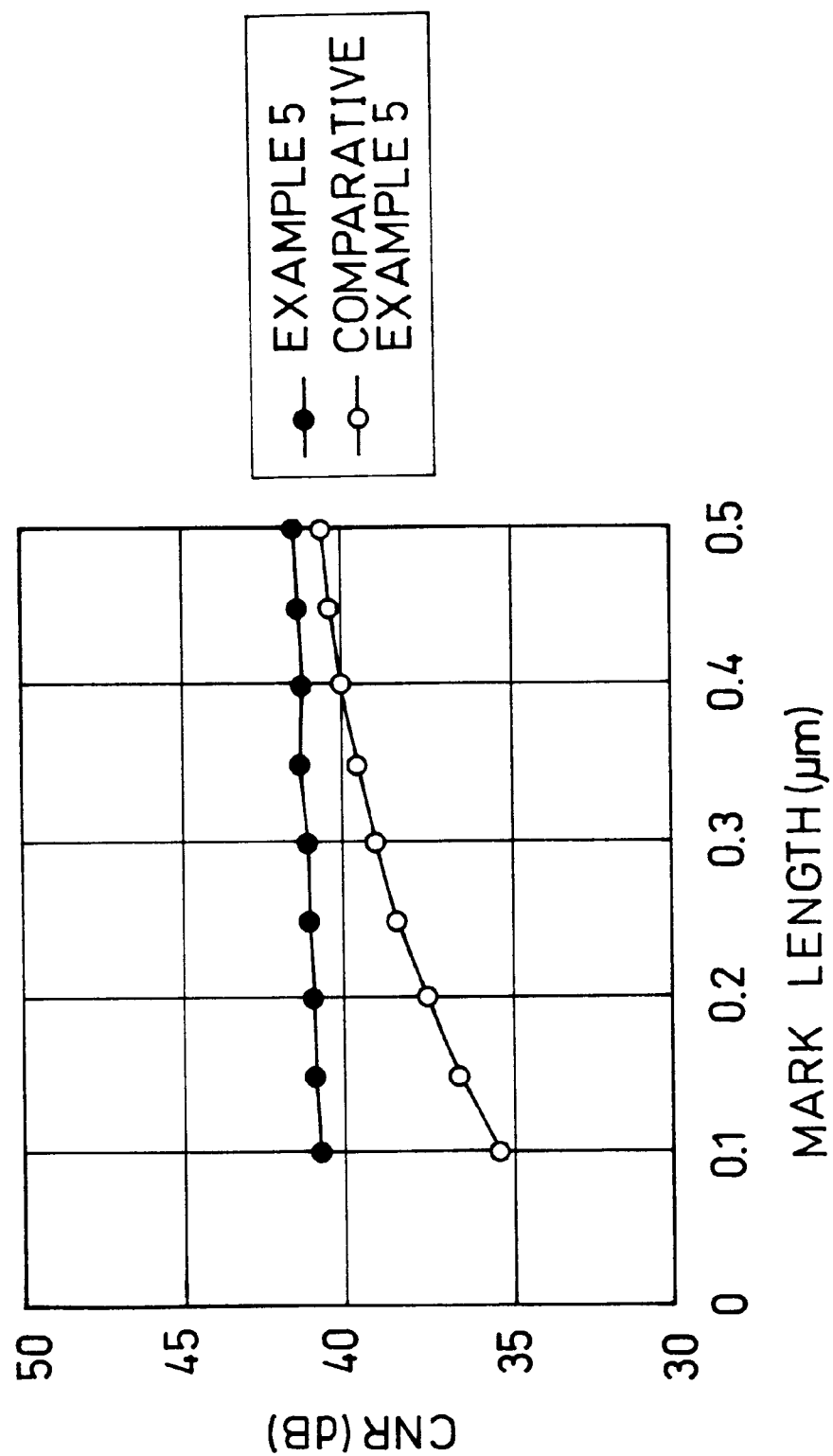
FIG. 12 is a graph showing dependence on a mark length with regard to a CNR of the magneto-optical disk of the example 5.

Next, a measurement is made under a continuous irradiation of the recording/reproducing laser of 1.8 mW. FIG. 12 shows a dependence on the mark length with regard to a CNR(Carrier to Noise Ratio). Additionally, as the example 5, FIG. 12 shows the result of the magneto-optical disk formed in the above-mentioned procedure. Further, for comparison, without using the fifth magnetic layer 20, FIG. 12 shows a CNR of a magneto-optical disk in which a film thickness of the fourth magnetic layer 19 is 30 nm, as a comparative example 5(the magneto-optical disk in accordance with the invention described in the first embodiment).

In the example 5, the fourth magnetic layer 19 and the fifth magnetic layer 20, whose polarities are different from each other, are stacked so that a leakage flux is reduced and a CNR of not less than 40 dB is obtained at a mark length ranging from 0.1 to 0.5 μm as in the case of the example 1. Meanwhile, in the comparative example 5, it is possible to obtain merely a CNR smaller than that of the example 5.

This is because in the magneto-optical recording medium of the comparative example 5, a perpendicularly magnetized film having a TMrich composition is adopted as the fourth magnetic layer 19 without using the fifth magnetic layer 20 so as to increase a leakage flux appearing in the fourth magnetic layer 19 and to prevent a domain wall from smoothly shifting in the first magnetic layer 1.

This phenomenon considerably tends to appear when the mark length is short. This is because when a domain period recorded on the fourth magnetic layer 19 is short, an inverse period of a leakage flux, which appears in the fourth magnetic layer 19, becomes shorter as well so that a shift of a domain wall is greatly affected in the first magnetic layer 1.

[Third Embodiment]

The following explanation describes the detail of a magneto-optical recording medium in accordance with the third embodiment of the present invention. In the first embodiment, a magnetic property of a third magnetic layer 3 is adjusted and a leakage flux appearing in the third magnetic layer 3 is reduced so as to realize a smooth shift of a domain wall in a first magnetic layer. In contrast, in the present embodiment, as shown in FIG. 13, a sixth magnetic layer 21 and a seventh magnetic layer 22, which have different magnetic polarities, are stacked instead of the first magnetic layer 1 so as to serve as a reproducing layer.

With this arrangement, total magnetization of the sixth magnetic layer 21 and the seventh magnetic layer 22 are arranged in parallel in the opposite direction from each other; thus, it is possible to reduce influence, which is exerted by a leakage flux appearing in the third magnetic layer 3 or a leakage flux appearing in an optical pickup, etc. on a domain wall shifting in the sixth magnetic layer 21 and the seventh magnetic layer 22, and it is further possible to realizes a smooth shift of a domain wall in the sixth magnetic layer 21 and the seventh magnetic layer 22.

Figure 13:
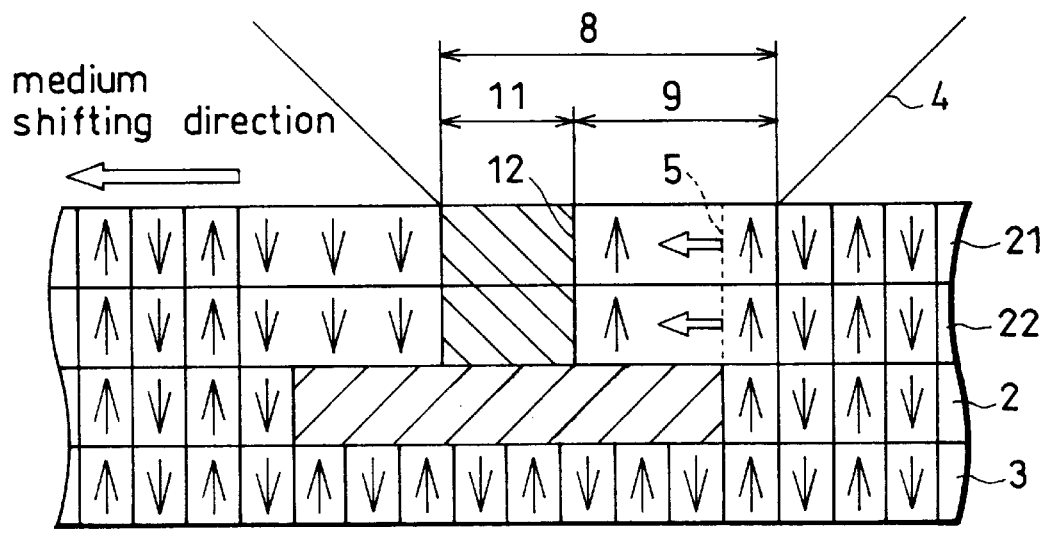
FIG. 13 is a sectional model drawing for explaining a principle of reproduction of the magneto-optical disk of the third embodiment.
Figure 14:
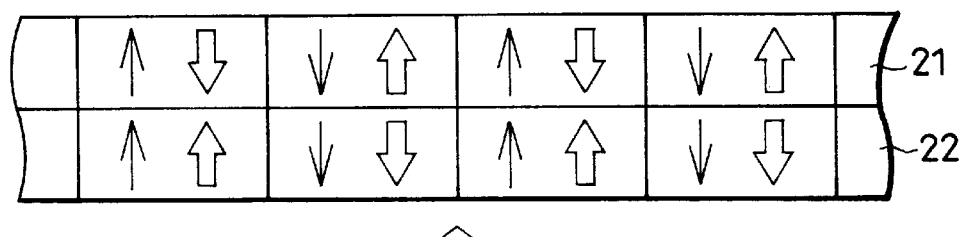
FIG. 14 is a sectional model drawing for explaining a magnetic property of the magneto-optical disk illustrated in FIG. 13.
Figure 14:
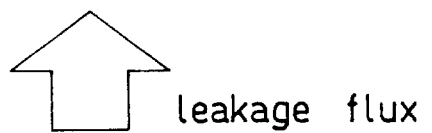

FIG. 14 is an expanded sectional view showing merely the sixth magnetic layer 21 and the seventh magnetic layer 22 of FIG. 13. Referring to FIG. 14, the following explanation describes a state in which influence of a leakage flux is reduced. In FIG. 14, the sixth magnetic layer 21 is made of a perpendicularly magnetized film which continuously maintains a RErich composition from room temperature to the Curie temperature. The TM moment and total magnetization are arranged in parallel in the opposite direction from each other.

Meanwhile, the seventh magnetic layer 22 is made of a perpendicularly magnetized film which continuously maintains a TMrich composition from room temperature and to the Curie temperature, and the TM moment and total magnetization are arranged in parallel in the same direction.

Here, the sixth magnetic layer 21 is stacked on the seventh magnetic layer 22 so that an exchange coupling force allows the TM moment directions of both layers to be aligned in parallel in the same direction. In this case, the total magnetization of the sixth magnetic layer 21 and the total magnetization of the seventh magnetic layer 22 are arranged in parallel in the opposite direction from each other. A leakage flux appearing in the third magnetic layer 3 or the pickup, etc. is magnetostatically coupled to the total magnetization of the layers so as to give an influence on a domain wall shifting in the sixth magnetic layer 21 and the seventh magnetic layer 22. However, the total magnetization of the sixth magnetic layer 21 and the total magnetization of the seventh magnetic layer 22 are arranged in parallel in the opposite direction from each other so that influences, which are exerted by magnetostatic couplings to the leakage fluxes, are balanced with each other; therefore, it is possible to realize a smooth shift of a domain wall in the sixth magnetic layer 21 and the seventh magnetic layer 22.

Additionally, in the reproduction of the magneto-optical recording medium of the present embodiment, an optical-beam irradiating means of a reproducing apparatus irradiates a light beam, which is intensive enough to heat the sixth magnetic layer 21 and the seventh magnetic layer 22 to more than the Curie temperature. The intensity of the light beam is controlled by a controlling means of the reproducing apparatus.

Next, referring to figures, the following explanation describes a case in which the magneto-optical recording medium of the present embodiment is used for a magneto-optical disk.

Figure 15:
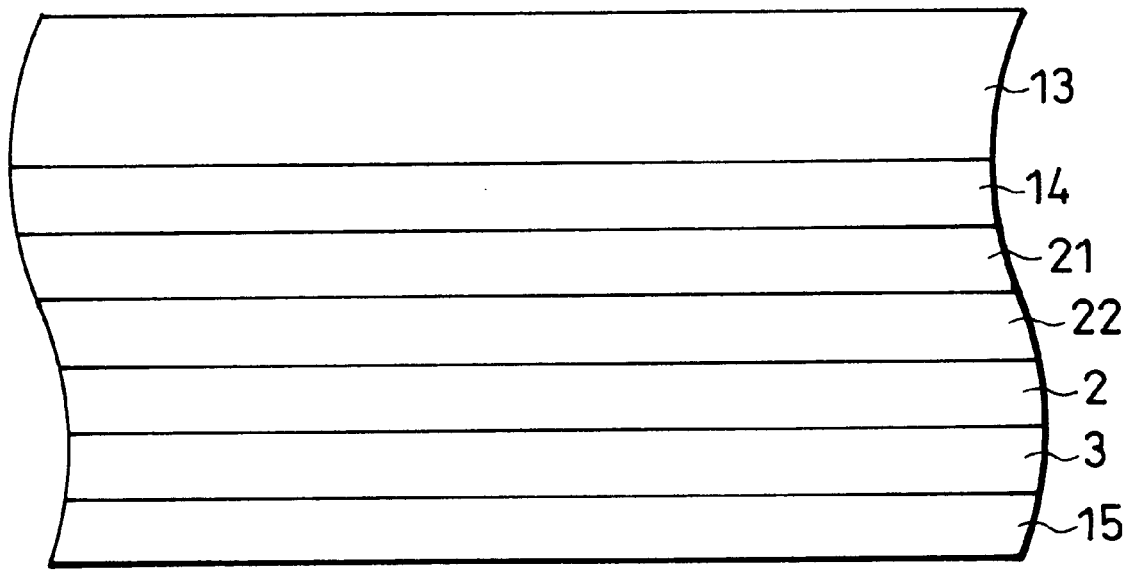
FIG. 15 is a sectional view showing a construction of a magneto-optical disk of the third embodiment.

As shown in FIG. 15, the magneto-optical medium of the present embodiment has a construction in which a transparent dielectric protecting layer 14, the sixth magnetic layer 21, the seventh magnetic layer 22, a second magnetic layer 2, the third magnetic layer 3, and a protecting layer 15 are successively formed on a magneto-optical disk substrate 13.

With regard to the substrate 13, the transparent dielectric protecting layer 14, the second magnetic layer 2, the third magnetic layer 3, and the protecting layer 15 of the third embodiment, it is possible to adopt the same materials described in the first embodiment.

Each of the sixth magnetic layer 21 and the seventh magnetic layer 22 is a perpendicularly magnetized film made of an alloy of rare earth transition metals having a relatively smaller domain wall coercivity and a larger domain wall mobility than those of the third magnetic layer 3 around a reproducing temperature. Assuming that the sixth magnetic layer 21, the seventh magnetic layer 22, the second magnetic layer 2, and the third magnetic layer 3 respectively have Curie temperatures of Tc6, Tc7, Tc2, and Tc3, Tc6, Tc7, Tc2, and Tc3 are arranged so as to satisfy a condition of Tc2<Tc6≈Tc7<Tc3. Further, the total magnetization of the sixth magnetic layer 21 and the total magnetization of the seventh magnetic layer 22 are arranged in parallel in the opposite direction from each other, and the magnetic polarities of the sixth magnetic layer 21 and the seventh magnetic layer 22 are arranged so as to be different from each other.

Namely, in the case when a perpendicularly magnetized film having a RErich composition made of an alloy of rare earth transition metals is adopted as the sixth magnetic layer 21, it is necessary to adopt a perpendicularly magnetized film having a TMrich composition made of an alloy of rare earth transition metals, as the seventh magnetic layer 22; meanwhile, in the case when a perpendicularly magnetized film having a TMrich composition made of an alloy of rare earth transition metals is adopted as the sixth magnetic layer 21, it is necessary to adopt a perpendicularly magnetized film having a RErich composition made of an alloy of rare earth transition metals, as the seventh magnetic layer 22.

Moreover, in order to effectively reduce the influence of the leakage flux that is exerted on a shift of a domain wall, it is desirable to set the Curie temperatures Tc6 and Tc7 of the sixth magnetic layer 21 and the seventh magnetic layer 22 at virtually the same temperature. Here, it is desirable to set Curie temperatures Tc6 and Tc7 of the sixth magnetic layer 21 and the seventh magnetic layer 22 at between 140° C. and 240° C.

In the case of Tc6, Tc7<140° C., the Curie temperatures of the sixth magnetic layer 21 and the seventh magnetic layer 22 become low; accordingly, a Kerr rotation angle is considerably reduced and intensity of a reproduced signal is also reduced so that a favorable reproducing property cannot be obtained.

In the case of Tc6, Tc7>240° C., upon reproducing, it is necessary to partially heat the sixth magnetic layer 21 and the seventh magnetic layer 22 at more than 240° C. by irradiating an optical beam 4; therefore, a slight increase in temperature allows the medium to be heated to more than the Curie temperature of the third magnetic layer 3 so that recorded information is erased and a power margin for reproduction becomes extremely narrow.

Moreover, it is desirable to set a total film thickness of the sixth magnetic layer 21 and the seventh magnetic layer 22 at between 20 nm and 80 nm. If the total film thickness is less than 20 nm, the amount of transmitted light increases so that a favorable masking effect cannot be obtained, and the intensity of a reproduced signal is reduced, resulting in a degradation in a reproducing property. Additionally, if the total film thickness exceeds 80 nm, sensitivity for recording is considerably degraded due to an increase in the film thickness.

As the sixth magnetic layer 21 and the seventh magnetic layer 22, it is possible to adopt a perpendicularly magnetized film which is made of materials selected from: GdFe and GdFeD or GdFeCoD(D is made of one or more elements selected from Y, Ti, V, Cr, Pd, Cu, Si, and Al), and GdHRFe, GdHRFeCo, or GdHRFeCoD(HR is a heavy rare earth metal, and is made of one or more elements selected from Tb, Dy, Ho, and Er, and D is made of one or more elements selected from Y, Ti, V, Cr, Pd, Cu, Al, and Si), and GdLRFe, GdLRFeCo, or GdLRFeCoD(LR is a light rare earth metal, and is made of one or more elements selected from Ce, Pr, Nd, and Sm, meanwhile D is made of one or more elements selected from Y, Ti, V, Cr, Pd, Cu, Al, and Si).

In the present embodiment, it is merely necessary to arrange a magnetic polarity of the sixth magnetic layer 21 so as to be different from that of the seventh magnetic layer 22. The sixth magnetic layer 21 and the seventh magnetic layer 22 can be formed in a reversed procedure described in FIG. 15.

Moreover, in the above-mentioned arrangement, a thermal diffusion metal layer made of materials selected from Al, AlTa, AlTi, AlCr, AlNi, AlCo, and Cu is added so that it is possible to improve a thermal property of the medium. Further, in some cases, it is possible to form an ultraviolet cure resin, a thermosetting resin, or a lubricating layer on the protecting layer 15 or the thermal diffusion metal layer.

Additionally, in order to record in a lower magnetic field, it is possible to stack an auxiliary recording layer is in contact with the third magnetic layer 3 and has a smaller coercivity and a higher Curie temperature as compared with the third magnetic layer 3. As the auxiliary recording layer, for example, it is possible to adopt an perpendicularly magnetized film made of a perpendicularly magnetized film, which is made of materials selected from GdFeCo, GdTbFeCo, and GdDyFeCo.

Next, the following explanation describes an example of a forming method and a recording and reproducing method of the magneto-optical disk which has the above-mentioned arrangement.

EXAMPLE 6

(1) Forming Method of a Magneto-optical Disk

Firstly, in the same manner as the example 1, a transparent dielectric protecting layer 14 made of AlN is formed on a substrate 13 with a film thickness of 80 nm.

Next, after a sputtering device has been evacuated to $1\times10^{-6}$ Torr again, a gas of argon is filled therein, electricity is applied to a first alloy target of GdFeSi, and under the condition of gas pressure of $4\times10^{-3}$ Torr, a sixth magnetic layer 21 made of $(Gd_{0.30}Fe_{0.70})_{0.89}Si_{0.11}$ is formed on the transparent dielectric protecting layer 14 with a film thickness of 20 nm. The sixth magnetic layer 21 is a perpendicularly magnetized film which has a coercivity of 8kA/m at room temperature and a Curie temperature of 180° C., and which continuously maintains a RErich composition from room temperature to the Curie temperature(180° C.).

Successively, electricity is supplied to the second GdFeSi alloy target, and a seventh magnetic layer 22 made of $(Gd_{0.21}Fe_{0.79})_{0.83}Si_{0.17}$ is formed on the sixth magnetic layer 21 with a film thickness of 20 nm, under the condition of a gas pressure of $4\times10^{-3}$ Torr. The seventh magnetic layer 22 is a perpendicularly magnetized film which has a coercivity of 8 kA/m and a Curie temperature of 180° C. at room temperature, and which continuously maintains a TMrich composition from room temperature to the Curie temperature(180° C.).

And then, in the same manner as the example 1, a second magnetic layer 2 made of $Dy_{0.25}Fe_{0.75}$ is formed on the seventh magnetic layer 22 with a film thickness of 10 nm. The second magnetic layer 2 is a perpendicularly magnetized film with a compensation temperature of 40° C. and a Curie temperature of 80° C.

Next, in the same manner as the example 1, a third magnetic layer 3 made of $Tb_{0.27}(Fe_{0.88}Co_{0.12})_{0.73}$ is formed on the second magnetic layer 2 with a film thickness of 30 nm. The third magnetic layer 3 is a perpendicularly magnetized film with a compensation temperature of 160° C. and a Curie temperature of 260° C.

And then, on the third magnetic layer 3, in the same manner as the example 1, a protecting layer 15 made of AlN is formed with a thickness of 20 nm.

(2) Recording and Reproduction Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m so that repeated patterns of upward magnetization and downward magnetization are formed in the third magnetic layer 3 in accordance with the direction of the recording magnetic field, under a continuous irradiation of a recording/reproducing laser of 6.8 mW. Further, a modulation frequency is changed in the recording magnetic field so that a domain pattern, which has a mark length between 0.1 and 0.5 µm, is recorded. Here, the mark length means that the recording domain whose length corresponds to the mark length is formed with a pitch which is twice as long as the mark length.

Figure 16:
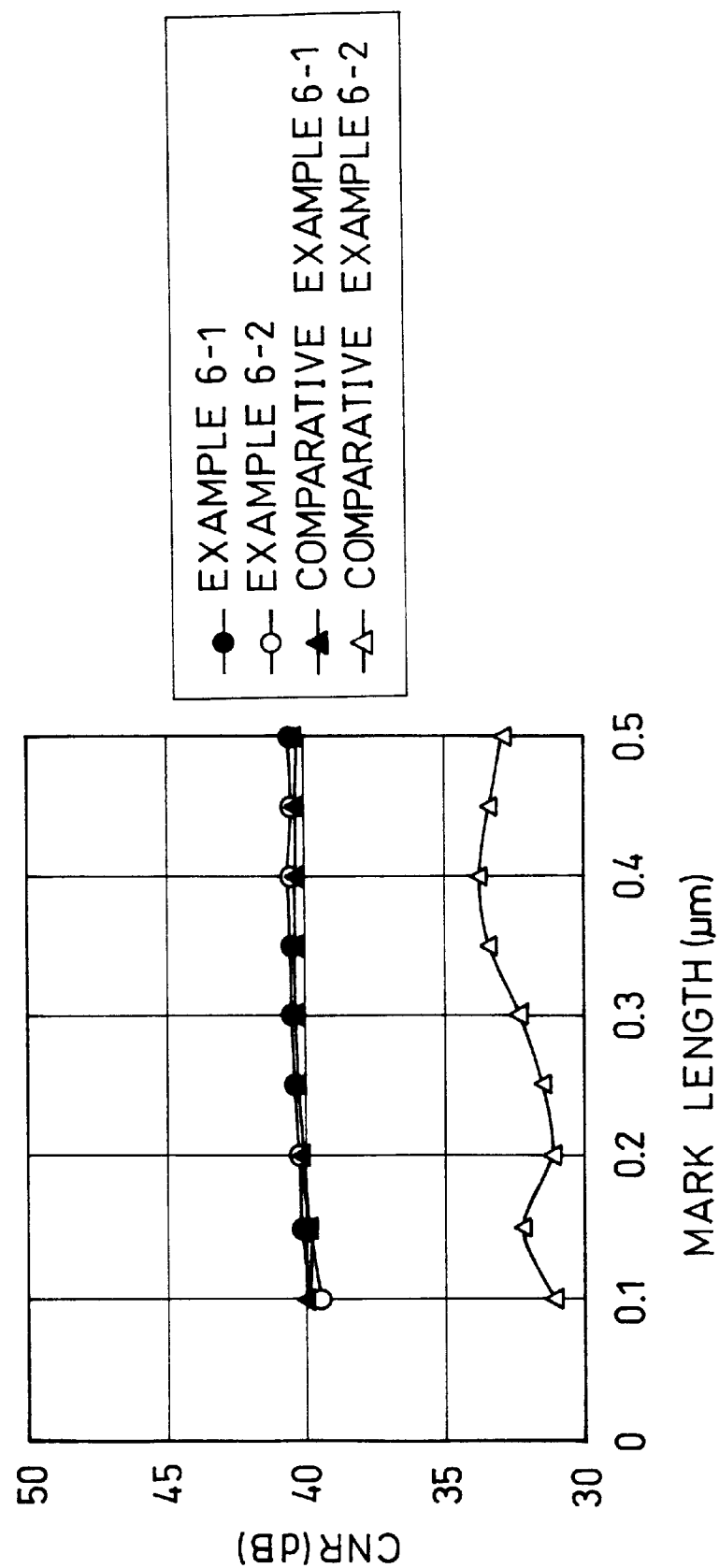
FIG. 16 is a graph showing dependence on a mark length with regard to a CNR of the magneto-optical disk of the example 6.

Next, with regard to a CNR, a dependence on the mark length is measured under a continuous irradiation of a recording/reproducing laser of 2.0 mW. FIG. 16 shows the result as the example 6-1.

For comparison, with the arrangement of the example 6, FIG. 16 shows a CNR of a magneto-optical disk in the case in which the film thickness of the sixth magnetic layer 21 is arranged at 40 nm without disposing the seventh magnetic layer 22, as the comparative example 6-1(an example of the invention of the first embodiment).

Further, on the assumption that a leakage flux appears from an optical pickup, the example 6-2 and the comparative example 6-2(an example of the invention of the first embodiment) respectively show results of measurement on CNRs of the example 6-1 and the comparative example 6-1 under an existence of a fixed external magnetic field of +4 kA/m.

In the present embodiment, the third magnetic layer 3 as described in the example 1 is adopted as the third magnetic layer 3 so that it is possible to reduce a leakage flux appearing from the third magnetic layer 3. Therefore, as shown in the example 6-1 and the comparative example 6-2, in a state in which the fixed external magnetic field does not exist, a favorable CNR can be obtained regardless of whether the seventh magnetic layer 22 exists or not.

However, in the case when the fixed external magnetic field is applied, as shown in the comparative example 6-2, in the magneto-optical recording medium which is not provided with the seventh magnetic layer 22, it is possible to obtain merely a CNR which is considerably lower than that of the comparative example 6-1 with regard to each of the mark lengths. Meanwhile, in the magneto-optical recording medium which is provided with the seventh magnetic layer 22, as shown in the example 6-2, it is possible to obtain a CNR which is as favorable as that of the example 6-1 and to achieve stability for reproduction with regard to the fixed external magnetic field.

[Fourth Embodiment]

Figure 17:
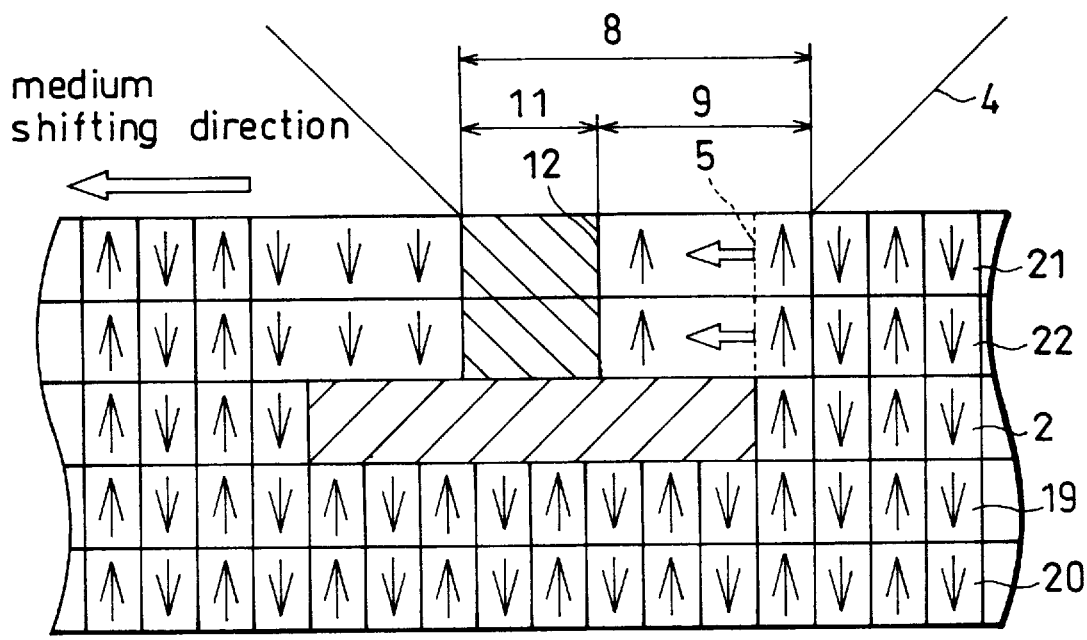
FIG. 17 is a sectional model drawing for explaining a principle of reproduction of the magneto-optical disk of the fourth embodiment.

FIG. 17 shows magnetization of a magneto-optical recording medium in accordance with a fourth embodiment of the present invention. In the present embodiment, the magneto-optical recording medium has a construction in which the second embodiment is combined with the third embodiment.

Namely, a fourth magnetic layer 19 and a fifth magnetic layer 20, whose magnetic polarities are different from each other, are stacked so as to reduce a leakage flux appearing in the fourth magnetic layer 19 and the fifth magnetic layer 20; thus, it is possible to realize a smooth shift of a domain wall in the reading magnetic layers (the sixth magnetic layer 21 and the seventh magnetic layer 22).

Further, a sixth magnetic layer 21 and a seventh magnetic layer 22, whose magnetic polarities are different from each other, are stacked so as to arrange total magnetization of the sixth magnetic layer 21 and total magnetization of the seventh magnetic layer 22 in parallel in the opposite direction from each other; thus, it is possible to reduce an influence, which is exerted by a leakage flux appearing in the fourth magnetic layer 19 and the fifth magnetic layer 20 or a leakage flux appearing in an optical pickup, etc., onto a domain wall shifting in the sixth magnetic layer 21 and the seventh magnetic layer 22, and to realize a smooth shift of a domain wall in the sixth magnetic layer 21 and the seventh magnetic layer 22.

Next, referring to figures, the following explanation describes a case in which the magneto-optical recording medium of the present embodiment is adopted for a magneto-optical disk.

Figure 18:
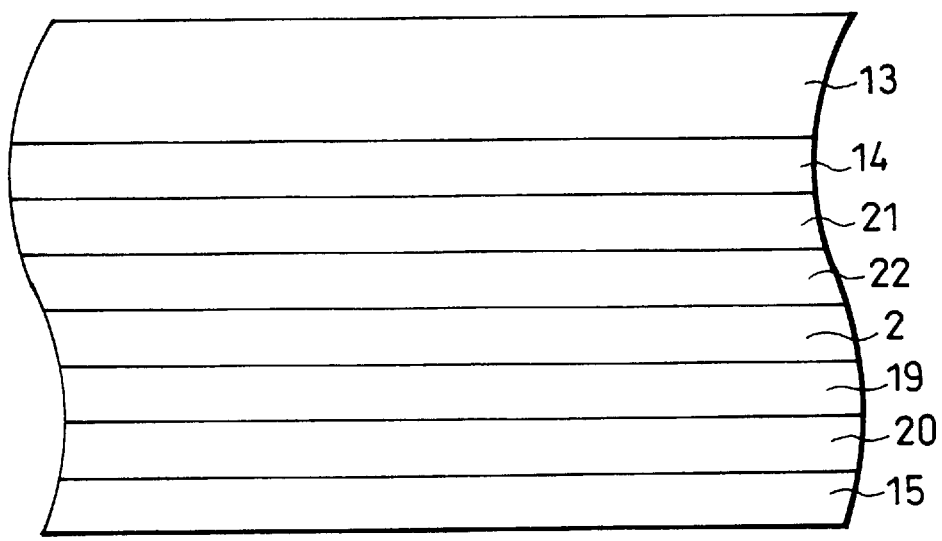
FIG. 18 is a sectional view showing a construction of a magneto-optical disk of the fourth embodiment.

As shown in FIG. 18, the magneto-optical medium of the present embodiment has a construction in which a transparent dielectric protecting layer 14, the sixth magnetic layer 21, the seventh magnetic layer 22, a second magnetic layer 2, the fourth magnetic layer 19, the fifth magnetic layer 20, and a protecting layer 15 are successively formed on a magneto-optical disk substrate 13.

Further, with regard to the substrate 13, the transparent dielectric protecting layer 14, the sixth magnetic layer 21, the seventh magnetic layer 22, the second magnetic layer 2, the fourth magnetic layer 19, the fifth magnetic layer 20, and the protecting layer 15 of the present embodiment, it is possible to adopt the same materials described in the second and third embodiments.

In the present embodiment, it is merely necessary to arrange a magnetic polarity of the fourth magnetic layer 19 so as to be different from that of the fifth magnetic layer 20. The fourth magnetic layer 19 and the fifth magnetic layer 20 can be formed in a reversed procedure described in FIG. 18.

In the present embodiment, it is merely necessary to arrange a magnetic polarity of the sixth magnetic layer 21 so as to be different from that of the seventh magnetic layer 22. The sixth magnetic layer 21 and the seventh magnetic layer 22 can be formed in a reversed procedure described in FIG. 18.

Moreover, in the above-mentioned arrangement, a thermal diffusion metal layer made of materials selected from Al, AlTa, AlTi, AlCr, AlNi, AlCo, and Cu is added on the protecting layer 15 so that it is possible to improve a thermal property of the medium. Further, in some cases, it is possible to form an ultraviolet cure resin, a thermosetting resin, or a lubricating layer on the protecting layer 15 or the thermal diffusion metal layer.

Additionally, in order to record in a lower magnetic field, it is possible to stack an auxiliary recording layer being contact with one of the fourth magnetic layer 19 and the fifth magnetic layer 20 that has a higher Curie temperature than the other. The auxiliary recording layer has a smaller coercivity and a higher Curie temperature as compared with the layer. As the auxiliary recording layer, for example, it is possible to adopt a perpendicularly magnetized film which is made of materials selected from GdFeCo, GdTbFeCo, and GdDyFeCo.

Next, the following explanation describes an example of a forming method and a recording and reproducing method of the magneto-optical disk which has the above-mentioned arrangement.

EXAMPLE 7

(1) Forming Method of a Magneto-optical Disk

The following explanation discusses a forming method of a magneto-optical disk having the above-mentioned construction.

Firstly, in the same manner as the example 6, a transparent dielectric protecting layer 14 made of AlN with a film thickness of 80 nm, a sixth magnetic layer 21 made of $(Gd_{0.30}Fe_{0.70})_{0.89}Si_{0.11}$ with a film thickness of 20 nm, and a seventh magnetic layer 22 made of $(Gd_{0.21}Fe_{0.79})_{0.83}Si_{0.17}$ with a film thickness of 20 nm, and a second magnetic layer 2 made of $Dy_{0.25}Fe_{0.75}$ with a film thickness of 10 nm are formed on a substrate 13.

Next, in the same manner as the example 5, a fourth magnetic layer 19 made of $Tb_{0.20}(Fe_{0.90}Co_{0.10})_{0.80}$ with a film thickness of 15 nm, a fifth magnetic layer 20 made of $Tb_{0.30}(Fe_{0.87}Co_{0.13})_{0.70}$ with a film thickness of 15 nm, and a protecting layer 15 made of AlN with a film thickness of 20 nm are formed.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m so that repeated patterns of upward magnetization and downward magnetization are formed in the fourth magnetic layer 19 and the fifth magnetic layer 20 in accordance with the direction of the recording magnetic field, under a continuous irradiation of a recording/reproducing laser of 7.1 mW. Moreover, a modulation frequency is changed in the recording magnetic field so that a domain pattern, which has a mark length between 0.1 and 0.5 μm, is recorded. Here, the mark length means that the recording domain whose length corresponds to the mark length is formed with a pitch which is twice as long as the mark length.

Figure 19:
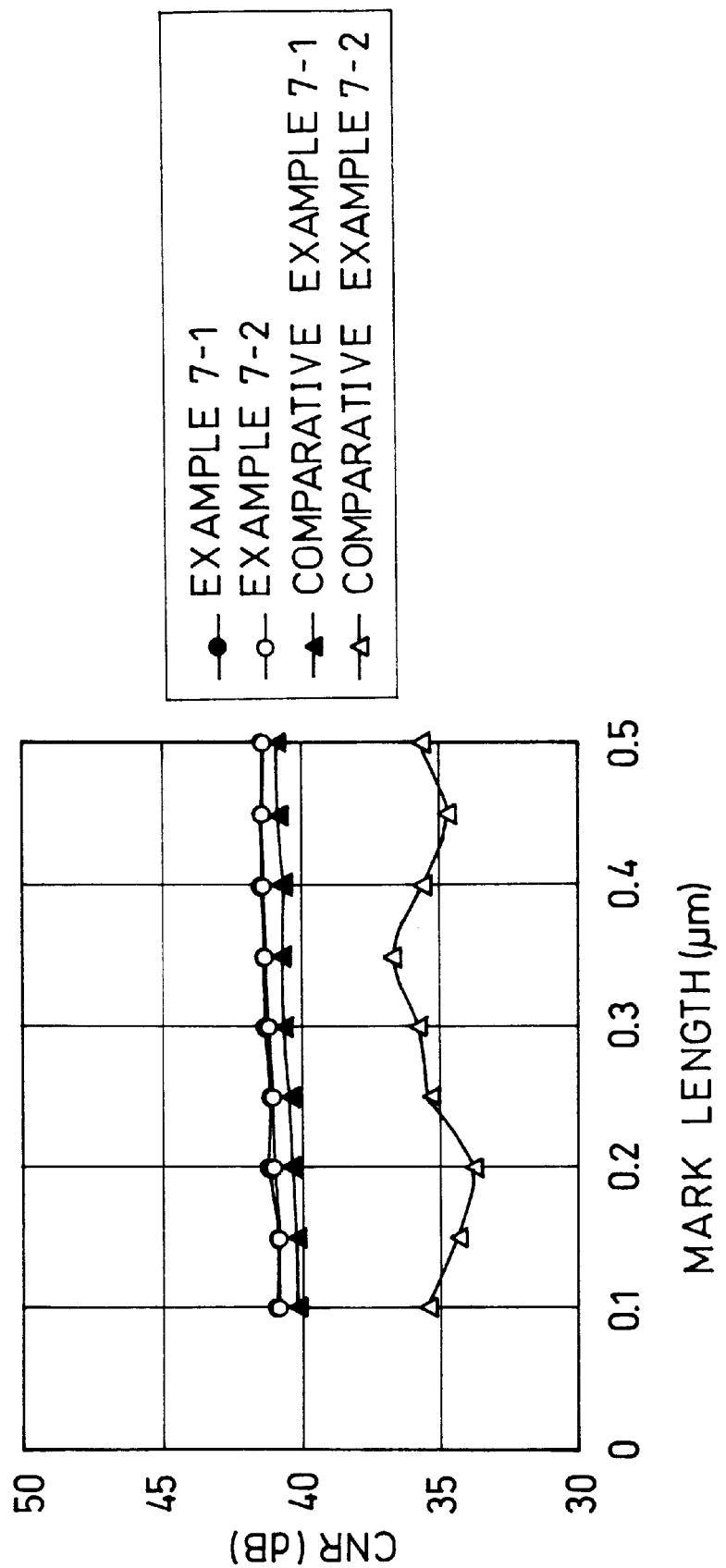
FIG. 19 is a graph showing dependence on a mark length with regard to a CNR of the magneto-optical disk of the example 7.

Next, a CNR is measured while the recording/reproducing laser is continuously irradiated at 2.2 mW. FIG. 19 shows the dependence on the mark length as the example 7-1. Further, for comparison, FIG. 19 shows a CNR of the magneto-optical disk of Example 7 that is provided with the sixth magnetic layer 21 having a film thickness of 40 nm without disposing the seventh magnetic layer 22, as the comparative example 7-1 (one example of the invention of the second embodiment).

Further, on the assumption that a leakage flux appears from the optical pickup, the example 7-2 and the comparative example 7-2 respectively show results of measurement on CNRs of the example 7-1 and the comparative example 7-1 under an existence of a fixed external magnetic field of +4 kA/m.

In the present embodiment, in the same manner as the example 5, the fourth magnetic layer 19 and the fifth magnetic layer 20, whose magnetic polarities are different from each other, are adopted so that it is possible to reduce a leakage flux appearing in the fourth magnetic layer 19 and the fifth magnetic layer 20. Therefore, as shown in the example 7-1 and the comparative example 7-2, in a state in which the fixed external magnetic field does not exist, a favorable CNR can be obtained regardless of whether the seventh magnetic layer 22 exists or not.

However, in the case when the fixed external magnetic field is applied, as shown in the comparative example 7-2, in the magneto-optical recording medium which is not provided with the seventh magnetic layer 22, it is possible to obtain merely a CNR which is considerably lower than that of the comparative example 7-1 with regard to each of the mark lengths; thus, it is understood that in the case when the seventh magnetic layer 22 is not provided, it is not possible to achieve stability for reproduction with regard to the fixed external magnetic field.

Meanwhile, in a magneto-optical recording medium which is provided with the seventh magnetic layer 22, as shown in the example 7-2, it is possible to obtain a CNR which is as favorable as that of the example 7-1 and to achieve stability for reproduction with regard to the fixed external magnetic field.

[Fifth Embodiment]

The present embodiment is another arrangement of the magneto-optical recording medium of the above-mentioned embodiment, that makes it possible to realize a smooth shift of a domain wall in a first magnetic layer (or a sixth magnetic layer 21 and a seventh magnetic layer 22), and to realize a recording in a low magnetic field.

EXAMPLE 8

The example 5 of the second embodiment shows the magneto-optical recording medium in which a transparent dielectric protecting layer 14 made of AlN with a film thickness of 80 nm, a first magnetic layer 1 made of $(Gd_{0.27}Fe_{0.73})_{0.85}Si_{0.15}$ with a film thickness of 40 nm, a second magnetic layer 2 made of $Dy_{0.25}Fe_{0.75}$ with a film thickness of 10 nm, a fourth magnetic layer 19 made of $Tb_{0.20}(Fe_{0.90}Co_{0.10})_{0.80}$ with a film thickness of 15 nm, a fifth magnetic layer 20 made of $Tb_{0.30}(Fe_{0.87}Co_{0.13})_{0.70}$ with a film thickness of 15 nm, and a protecting layer 15 made of AlN with a film thickness of 20 nm are formed on a substrate 13.

In order to realize a recording in a low magnetic field, as described in the example 5, as an auxiliary recording layer, it is possible to stack a perpendicularly magnetized film being contact with one of the fourth magnetic layer 19 and the fifth magnetic layer 20 that has a higher Curie temperature than the other. The perpendicularly magnetized film has a smaller coercivity and a higher Curie temperature as compared with the layer.

In contrast, in the present example, the fourth magnetic layer 19 is made of a perpendicularly magnetized film having a smaller coercivity and a higher Curie temperature than the fifth magnetic layer 20 so that the fourth magnetic layer 19 also serves as the auxiliary recording layer. This arrangement makes it possible to reduce a leakage flux appearing in the fourth magnetic layer 19 and the fifth magnetic layer 20, to realize a smooth shift of a domain wall in the first magnetic layer 1, and to achieve a recording in a low magnetic field without adding a step for manufacturing the auxiliary recording layer.

Here, the fourth magnetic layer 19 is exchangeably coupled to the fifth magnetic layer 20 so that a domain wall is not allowed to shift at a predetermined reproducing temperature; thus, the fourth magnetic layer 19 is also allowed to be formed of a perpendicularly magnetized film which has a smaller coercivity and a greater mobility of a domain wall as compared with the first magnetic layer 1. However, it is necessary to arrange the first magnetic layer 1 as a perpendicularly magnetized film in which a coercivity of a domain wall is relatively smaller and the mobility of a domain wall is larger as compared with the fifth magnetic layer 20, at a predetermined temperature. The following explanation describes an example of a forming method and a recording and reproducing method of the magneto-optical disk having this construction.

(1) Forming Method of the Magneto-optical Disk

Firstly, in the same manner as the example 5, a transparent dielectric protecting layer 14 made of AlN with a film thickness of 80 nm, a first magnetic layer 1 made of $(Gd_{0.27}Fe_{0.73})_{0.85}Si_{0.15}$ with a film thickness of 40 nm, and a second magnetic layer 2 made of $Dy_{0.25}Fe_{0.75}$ with a film thickness of 10 nm are formed on a substrate 13.

Next, electricity is applied to an alloy target of GdFeCo, and under the condition of gas pressure of $4 \times 10^{-3}$ Torr, a fourth magnetic layer 19 made of $Gd_{0.19}(Fe_{0.93}Co_{0.07})_{0.81}$ is formed on the second magnetic layer 2 with a film thickness of 15 nm. The fourth magnetic layer 19 is a perpendicularly magnetized film which has a coercivity of 16 kA/m at room temperature and a Curie temperature of 270° C., and which continuously maintains a TMrich composition from room temperature to the Curie temperature(270° C.).

Next, electricity is applied to an alloy target of TbFeCo, and under the condition of gas pressure of $4 \times 10^{-3}$ Torr, a fifth magnetic layer 20 made of $Tb_{0.30}(Fe_{0.87}Co_{0.13})_{0.70}$ is formed on the fourth magnetic layer 19 with a film thickness of 15 nm. The fifth magnetic layer 20 is a perpendicularly magnetized film which has a coercivity of 400 kA/m at room temperature and a Curie temperature of 255° C., and which continuously maintains a RErich composition from room temperature to the Curie temperature(255° C.).

And then, in the same manner as the example 1, a protecting layer 15 made of AlN is formed on the fifth magnetic layer 20 with a film thickness of 20 nm.

Moreover, in the above-mentioned arrangement, a thermal diffusion metal layer made of materials selected from Al, AlTa, AlTi, AlCr, AlNi, AlCo, and Cu is added so that it is possible to improve a thermal property of the medium. Further, in some cases, it is possible to form an ultraviolet cure resin, a thermosetting resin, or a lubricating layer on the protecting layer 15 or the thermal diffusion metal layer.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±9 kA/m so that repeated patterns of upward magnetization and downward magnetization are formed in the fourth magnetic layer 19 and the fifth magnetic layer 20 in accordance with the direction of the recording magnetic field, under a continuous irradiation of a recording/reproducing laser of 6.5 mW. Further, a modulation frequency is changed in the recording magnetic field so that a domain pattern having a mark length between 0.1 and 0.5 µm is recorded. Here, the mark length means that the recording domain whose length corresponds to the mark length is formed with a pitch which is twice as long as the mark length.

Figure 20:
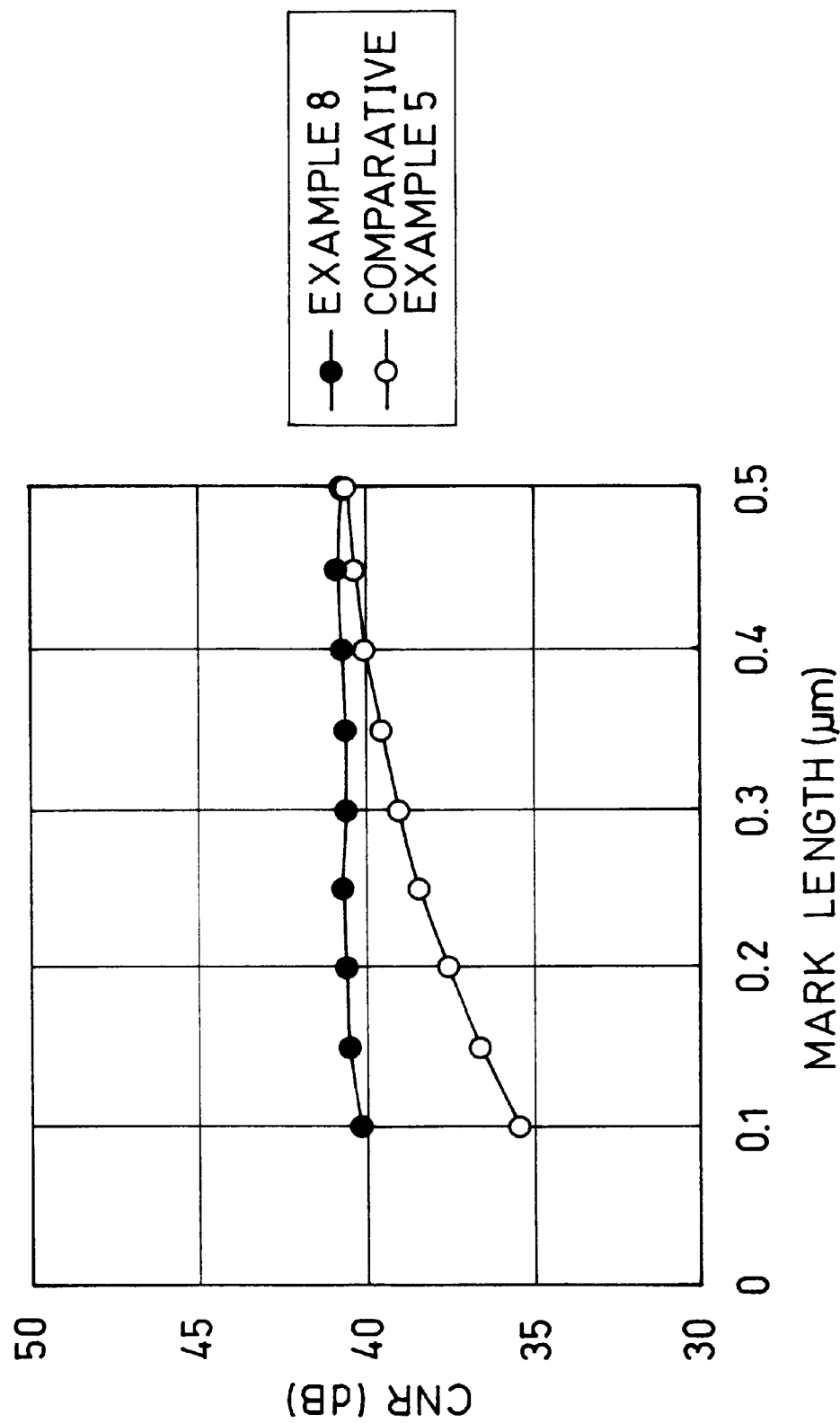
FIG. 20 is a graph showing dependence on a mark length with regard to a CNR of the magneto-optical disk of the example 8.

Next, with regard to a CNR, a dependence on the mark length is measured under a continuous irradiation of the recording/reproducing laser of 1.8 mW. FIG. 20 shows the result as the example 8. For comparison, with the arrangement of the example 5, FIG. 20 shows a CNR of a magneto-optical disk in the case in which the film thickness of the fourth magnetic layer 19 is arranged at 30 nm without disposing the fifth magnetic layer 20, as the comparative example 5.

In the present example, the fourth magnetic layer 19 and the fifth magnetic layer 20, whose polarities are different from each other, are stacked so as to reduce a leakage flux. Therefore, as in the case of the example 1, a CNR of not less than 40 dB can be obtained at a mark length ranging from 0.1 to 0.5 µm; meanwhile, in the comparative example 5, it is possible to obtain merely a CNR which is smaller than that of the example 5.

This is because in the magneto-optical recording medium of the comparative example 5, a perpendicularly magnetized film having a TMrich composition is adopted as the fourth magnetic layer 19 without using the fifth magnetic layer 20 so as to increase a leakage flux appearing from the fourth magnetic layer 19 and to prevent a domain wall from smoothly shifting in the first magnetic layer 1. The mark length becomes shorter so as to shorten a domain period which is recorded in the fourth magnetic layer 19, and an inverse period of a leakage flux which appears from the fourth magnetic layer 19, thereby greatly affecting a shift of a domain wall in the first magnetic layer 1. Therefore, the CNR is considerably reduced in a region having a short mark length.

Figure 21:
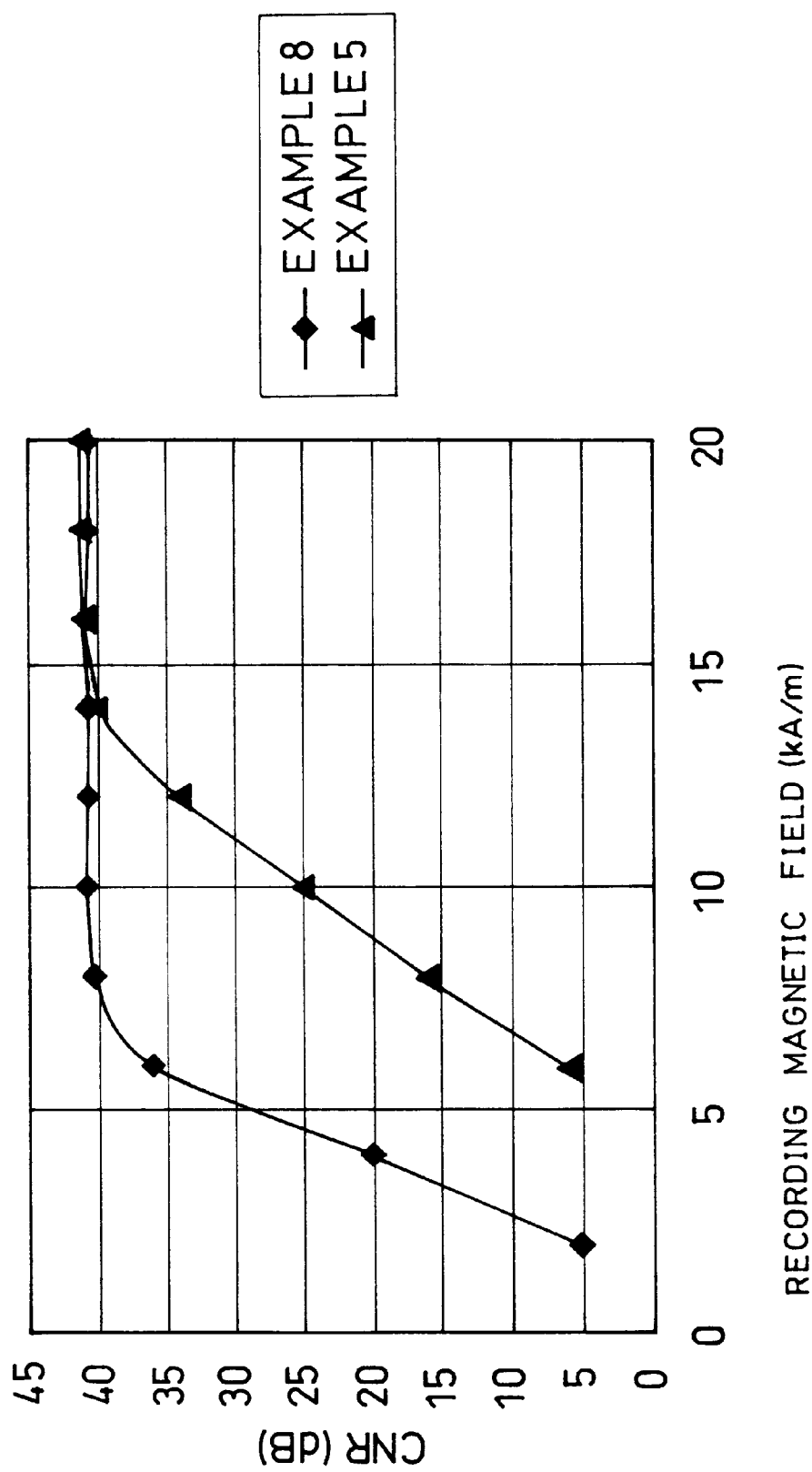
FIG. 21 is a graph showing dependence on a recording magnetic field with regard to a CNR of the magneto-optical disk of the example 8.

Next, FIG. 21 shows a CNR which is dependent on a recording magnetic field that is measured at a mark length of 0.2 µm with regard to the magneto-optical disks of the example 5 and the example 8. In the example 5 which adopts a material of TbFeCo for the fourth magnetic layer 19, a recording magnetic field of approximately ±15 kA/m is necessary for saturating the CNR; meanwhile, in the example 8, an approximately ±8 kA/m recording magnetic field is enough large to saturate the CNR.

EXAMPLE 9

In the example 7, a magneto-optical recording medium having a construction in which: a transparent dielectric protecting layer 14 made of AlN with a film thickness of 80 nm, a sixth magnetic layer 21 made of $(Gd_{0.30}Fe_{0.70})_{0.89}Si_{0.11}$ with a film thickness of 20 nm, and a seventh magnetic layer 22 made of $(Gd_{0.21}Fe_{0.79})_{0.83}Si_{0.17}$ with a film thickness of 20 nm, a second magnetic layer 2 made of $Dy_{0.25}Fe_{0.75}$ with a film thickness of 10 nm, a fourth magnetic layer 19 made of $Tb_{0.20}(Fe_{0.90}Co_{0.10})_{0.80}$ with a film thickness of 15 nm, a fifth magnetic layer 20 made of $Tb_{0.30}(Fe_{0.87}Co_{0.13})_{0.70}$ with a film thickness of 15 nm, and a protecting layer 15 made of AlN with a film thickness of 20 nm are formed on a substrate 13.

In this magneto-optical recording medium, as described in the example 5, in order to record in a lower magnetic field, it is possible to stack a perpendicularly magnetized film as an auxiliary recording layer being contact with one of the fourth magnetic layer 19 and the fifth magnetic layer 20, that has a higher Curie temperature than the other. The perpendicularly magnetized film has a smaller coercivity and a higher Curie temperature as compared with the layer.

In contrast, in the present example, the fourth magnetic layer 19 is formed of a perpendicularly magnetized film having a smaller coercivity and a higher Curie temperature than the fifth magnetic layer 20 so that the fourth magnetic layer 19 can be also used as the auxiliary recording layer. This arrangement makes it possible to reduce a leakage flux appearing in the fourth magnetic layer 19 and the fifth magnetic layer 20, to realize a smooth shift of a domain wall in the sixth magnetic layer 21 and the seventh magnetic layer 22, and to achieve a recording in a low magnetic field without adding a step for manufacturing the auxiliary recording layer.

Here, the fourth magnetic layer 19 is exchangeably coupled to the fifth magnetic layer 20 so that a domain wall is not allowed to shift at a predetermined reproducing temperature; thus, the fourth magnetic layer 19 can be also formed of a perpendicularly magnetized film which has a smaller coercivity and a greater mobility of a domain wall as compared with the sixth magnetic layer 21 and the seventh magnetic layer 22. However, it is necessary to arrange the sixth magnetic layer 21 and the seventh magnetic layer 22 as perpendicularly magnetized films in which coercivity of domain walls are relatively smaller and the mobility of domain walls are larger as compared with the fifth magnetic layer 20, at a predetermined temperature. The following explanation describes an example of a forming method and a recording and reproducing method of the magneto-optical disk having this construction.

(1) Forming Method of the Magneto-optical Disk

Firstly, in the same manner as the example 7, a transparent dielectric protecting layer 14 made of AlN with a film thickness of 80 nm, a sixth magnetic layer 21 made of $(Gd_{0.30}Fe_{0.70})_{0.89}Si_{0.11}$ with a film thickness of 20 nm, and a seventh magnetic layer 22 made of $(Gd_{0.21}Fe_{0.79})_{0.83}Si_{0.17}$ with a film thickness of 20 nm, and a second magnetic layer 2 made of $Dy_{0.25}Fe_{0.75}$ with a film thickness of 10 nm are formed on a substrate 13.

Next, electricity is applied to an alloy target of GdFeCo, and under the condition of gas pressure of $4\times10^{-3}$ Torr, a fourth magnetic layer 19 made of $Gd_{0.19}(Fe_{0.93}Co_{0.07})_{0.81}$ is formed on the second magnetic layer 2 with a film thickness of 15 nm. The fourth magnetic layer 19 is a perpendicularly magnetized film which has a coercivity of 16 kA/m at room temperature and a Curie temperature of 270° C., and which continuously maintains a TMrich composition from room temperature to the Curie temperature(270° C.).

Next, electricity is applied to an alloy target of TbFeCo, and under the condition of gas pressure of $4\times10^{-3}$ Torr, a fifth magnetic layer 20 made of $Tb_{0.30}(Fe_{0.87}Co_{0.13})_{0.70}$ is formed on the fourth magnetic layer 19 with a film thickness of 15 nm. The fifth magnetic layer 20 is a perpendicularly magnetized film which has a coercivity of 400 kA/m and a Curie temperature of 255° C. at room temperature, and which continuously maintains a RErich composition from room temperature to the Curie temperature(255° C.).

And then, a protecting layer 15 made of AlN is formed on the fifth magnetic layer 20 with a film thickness of 20 nm.

Moreover, in the above-mentioned arrangement, a thermal diffusion metal layer made of materials selected from Al, AlTa, AlTi, AlCr, AlNi, AlCo, and Cu is added so that it is possible to improve a thermal property of the medium.

Further, in some cases, it is possible to form an ultraviolet cure resin, a thermosetting resin, or a lubricating layer on the protecting layer 15 or the thermal diffusion metal layer.

(2) Recording and Reproducing Property

The following explanation describes an evaluation result, in which the above-mentioned magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±9 kA/m so that repeated patterns of upward magnetization and downward magnetization are formed in the fourth magnetic layer 19 and the fifth magnetic layer 20 in accordance with the direction of the recording magnetic field, under a continuous irradiation of a recording/reproducing laser of 6.5 mW. A modulation frequency is changed in the recording magnetic field so that a domain pattern having a mark length between 0.1 and 0.5 µm is recorded. Here, the mark length means that the recording domain whose length corresponds to the mark length is formed with a pitch which is twice as long as the mark length.

Figure 22:
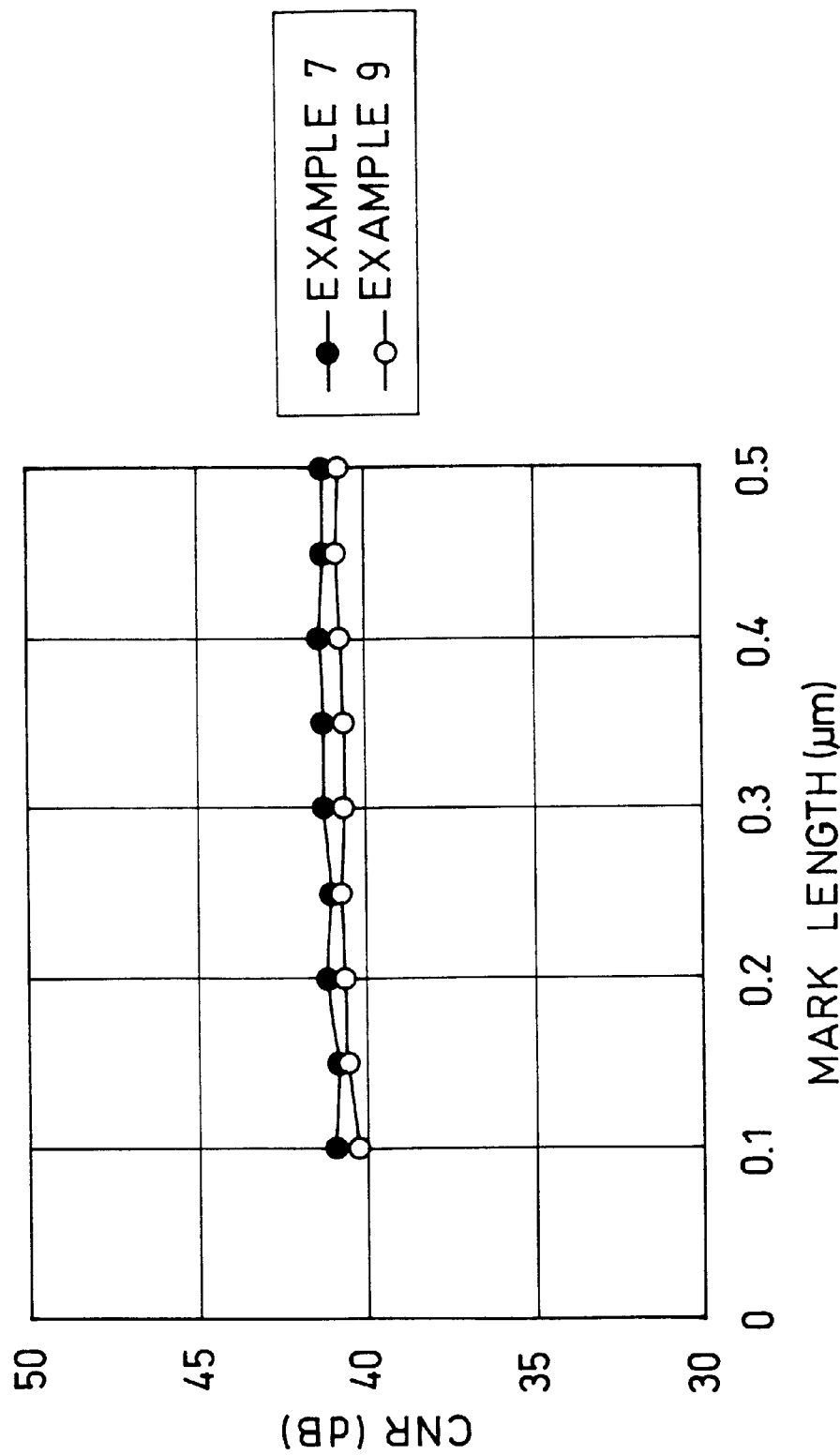
FIG. 22 is a graph showing dependence on a mark length with regard to a CNR of the magneto-optical disk of the example 9.

Next, with regard to a CNR, a dependence on the mark length is measured under a continuous irradiation of the recording/reproducing laser of 1.8 mW. FIG. 22 shows the result as the example 9.

For comparison, FIG. 22 shows a CNR of the magneto-optical disk of the example 7. In the example 9, the fourth magnetic layer 19 and the fifth magnetic layer 20 whose polarities are different from each other are stacked so as to reduce a leakage flux, and a CNR of not less than 40 dB can be obtained at a mark length between 0.1 and 0.5 in the same manner as the example 7.

Figure 23:
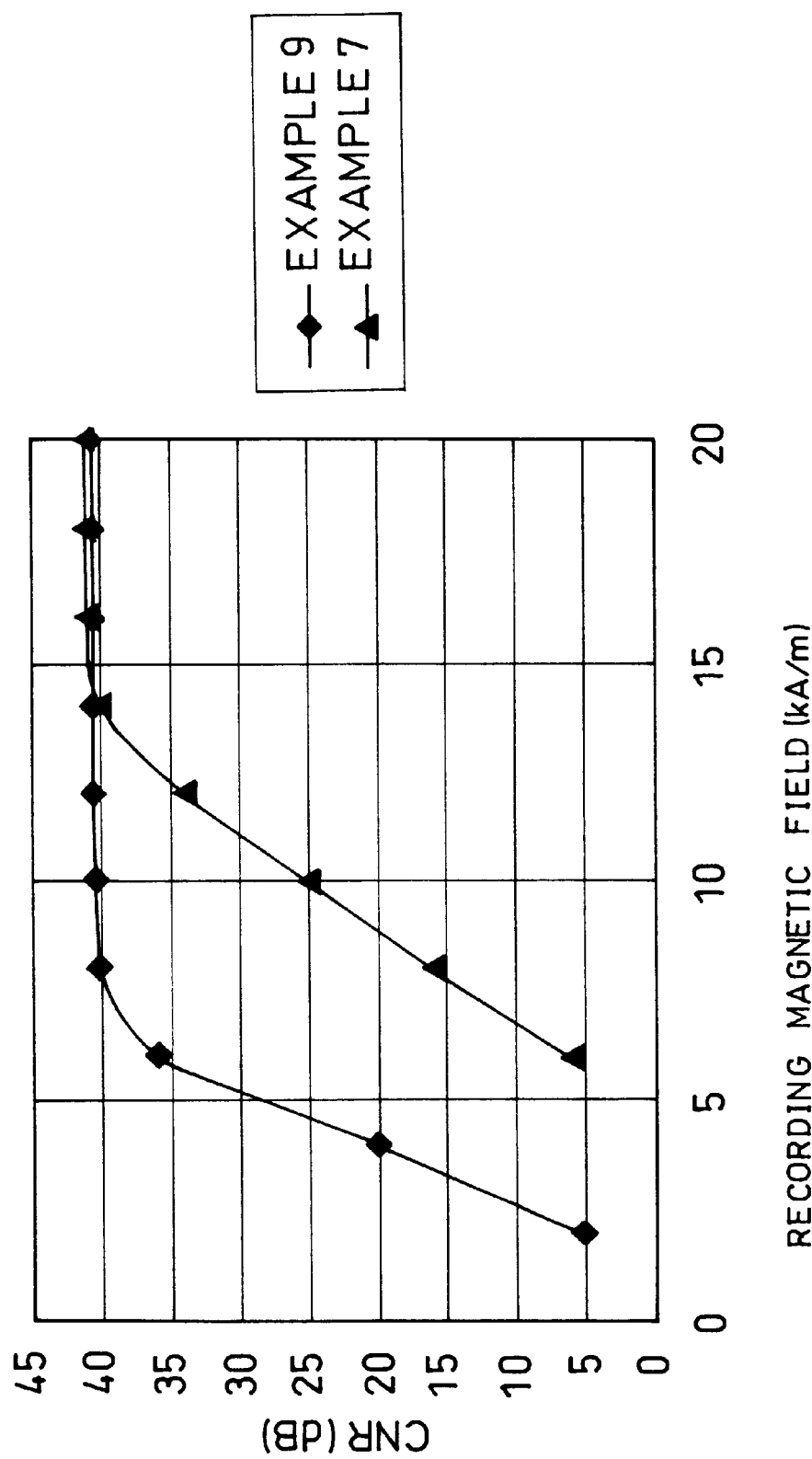
FIG. 23 is a graph showing dependence on a recording magnetic field with regard to a CNR of the magneto-optical disk of the example 9.
Figure 24:
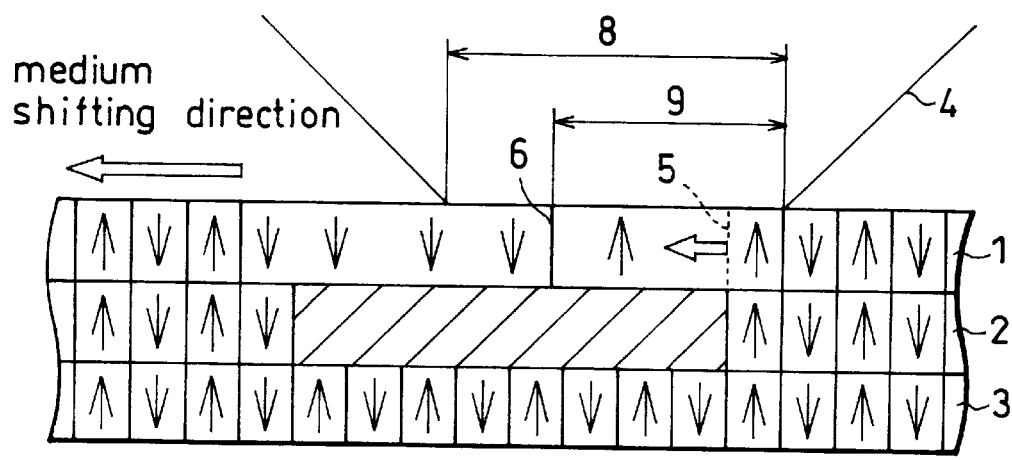
FIG. 24 is a sectional model drawing for explaining a principle of reproduction of a conventional magneto-optical disk.

And then, with regard to the magneto-optical disks of the example 7 and the example 9, FIG. 23 shows a result of a study on a CNR which is dependent on a recording magnetic field at a mark length of 0.2 µm. In the example 7 which adopts a material of TbFeCo as the fourth magnetic layer 19, a recording magnetic field of an approximately ±15 kA/m is necessary for saturating the CNR; meanwhile, in the example 9, an approximately ±8 kA/m is enough to saturate the CNR.

A magneto-optical recording medium of the present invention is also allowed to have the following construction: at least a first, second, and third magnetic layers are successively stacked; the first magnetic layer is made of a perpendicularly magnetized film whose domain wall coercivity is relatively smaller and whose domain wall mobility is relatively larger as compared with the third magnetic layer around a predetermined temperature; the perpendicularly magnetized film increases the temperature to more than the Curie temperature due to a heating upon reproduction; and when the first magnetic layer, the second magnetic layer, and the third magnetic layer respectively have Curie temperatures of Tc1, Tc2, and Tc3, a condition of Tc2<Tc1<Tc3 is satisfied.

The magneto-optical recording medium of the present invention is also allowed to have a construction in which when the first magnetic layer has a Curie temperature of Tc1 in the magneto-optical recording medium, a condition of 140° C.≦Tc1≦240° C. is satisfied.

The magneto-optical recording medium of the present invention is also allowed to have a construction in which when the first and second magnetic layers respectively have Curie temperatures of Tc1 and Tc2 in the magneto-optical recording medium, a condition of 40° C.≦Tc2≦Tc1−40° C. is satisfied.

The magneto-optical recording medium of the present invention is also allowed to have the following construction:

at least the first, second, and third magnetic layers are successively stacked; the first magnetic layer is made of a perpendicularly magnetized film whose domain wall coercivity is relatively smaller and whose domain wall mobility is relatively larger as compared with the third magnetic layer around a predetermined temperature; when the first magnetic layer, the second magnetic layer, and the third magnetic layer respectively have Curie temperatures of Tc1, Tc2, and Tc3, a condition of Tc2<Tc1<Tc3 is satisfied; and the first magnetic layer satisfies $-60°$ C.$\leq$Tcomp1 when the first magnetic layer has a compensation temperature of Tcomp1; or the first magnetic layer serves as a perpendicularly magnetized film having a RErich composition at a temperature of not less than 25° C.

The magneto-optical recording medium of the present invention is also allowed to have the following construction: at least the first, second, and third magnetic layers are successively stacked; the first magnetic layer is made of a perpendicularly magnetized film whose domain wall coercivity is relatively smaller and whose domain wall mobility is relatively larger as compared with the third magnetic layer around a predetermined temperature; when the first magnetic layer, the second magnetic layer, and the third magnetic layer respectively have Curie temperatures of Tc1, Tc2, and Tc3, a condition of Tc2<Tc1<Tc3 is satisfied; and the third magnetic layer satisfies $-40°$ C.$\leq$Tcomp3$\leq$Tc3 when the third layer has a compensation temperature of Tcomp3.

The magneto-optical recording medium of the present invention is also allowed to have the following construction: at least the first, second, fourth, and fifth magnetic layers are successively stacked; the first magnetic layer is made of a perpendicularly magnetized film whose domain wall coercivity is relatively smaller and whose domain wall mobility is relatively larger as compared with the fourth and fifth magnetic layers around a predetermined temperature; the fourth magnetic layer and the fifth magnetic layer have different magnetic polarities; when the first magnetic layer, the second magnetic layer, the fourth magnetic layer, and the fifth magnetic layer respectively have Curie temperatures of Tc1, Tc2, Tc4, and Tc5, conditions of Tc2<Tc1<Tc4 and Tc2<Tc1<Tc5 are satisfied.

The magneto-optical recording medium of the present invention is also allowed to have the following construction: at least the sixth, seventh, second, and third magnetic layers are successively stacked; each of the sixth and seventh magnetic layers is made of a perpendicularly magnetized film whose domain wall coercivity is relatively smaller and whose domain wall mobility is relatively larger as compared with the third magnetic layer around a predetermined temperature; the sixth magnetic layer and the seventh magnetic layer have different magnetic polarities; when the sixth magnetic layer, the seventh magnetic layer, the second magnetic layer, and the third magnetic layer, respectively have Curie temperatures of Tc6, Tc7, Tc2, and Tc3, conditions of Tc2<Tc6<Tc3 and Tc2<Tc7<Tc3 are satisfied.

The magneto-optical recording medium of the present invention is also allowed to have a construction in which Tc6 and Tc7 are virtually the same in the magneto-optical recording medium.

The magneto-optical recording medium of the present invention is also allowed to have the following construction: at least the first, second, fourth, and fifth magnetic layers are successively stacked; the first magnetic layer is made of a perpendicularly magnetized film whose domain wall coercivity is relatively smaller and whose domain wall mobility is relatively larger as compared with the fifth magnetic layer around a predetermined temperature; the fourth magnetic layer and the fifth magnetic layer have different magnetic polarities; the fourth magnetic layer has a smaller coercivity than the fifth magnetic layer; when the first magnetic layer, the second magnetic layer, the fourth magnetic layer, and the fifth magnetic layer, respectively have Curie temperatures of Tc1, Tc2, Tc4, and Tc5, a condition of Tc2<Tc1<Tc5<Tc4 is satisfied.

A reproducing apparatus of the magneto-optical recording medium in accordance with the present invention, that is a reproducing apparatus for reproducing the magneto-optical recording medium, is also allowed to include an irradiating means for emitting an optical beam on the magneto-optical recording medium upon reproducing, and a controlling means for controlling intensity of an irradiated light beam so as to heat the first magnetic layer of the magneto-optical recording medium to more than the Curie temperature.

The reproducing apparatus for the magneto-optical recording medium of the present invention, which is a reproducing apparatus for reproducing the above-mentioned magneto-optical recording medium, is also allowed to include an irradiating means for emitting an optical beam on the magneto-optical recording medium upon reproducing; and a controlling means for controlling intensity of an irradiated light beam so as to heat the sixth and seventh magnetic layers of the magneto-optical recording medium to more than the Curie temperatures.

A reproducing method of the magneto-optical recording medium of the present invention is a reproducing method for the above-mentioned magneto-optical recording medium, in which at least the first, second, and third magnetic layers are successively stacked, the first magnetic layer is made of a perpendicularly magnetized film whose domain wall coercivity is relatively smaller and whose domain wall mobility is relatively larger as compared with the third magnetic layer around a predetermined temperature, and Curie temperatures are arranged for the second magnetic layer, the first magnetic layer, and the third magnetic layer from lowest to highest, the method including a step of heating the first magnetic layer to more than the Curie temperature upon reproducing so as to form an area which regulates a shift of a domain.

As described above, in the magneto-optical recording medium of the present invention, the first magnetic layer, the second magnetic layer, and the third magnetic layer are successively stacked, and when the layers respectively have Curie temperatures of Tc1, Tc2, and Tc3, Tc2<Tc1<Tc3 is satisfied.

Such a magneto-optical recording medium and a reproducing method make it possible to expand and reproduce a domain without causing a repetition of reproduction and to reproduce a signal having a period which is not more than an optical diffraction limit without reducing an amplitude of the reproduced signal, thereby dramatically improving a recording density.

Further, the fourth magnetic layer and the fifth magnetic layer, which have different magnetic polarities, are used instead of the third magnetic layer so as to prevent a leakage flux appearing toward the first magnetic layer and to reduce an influence of the leakage flux on a reproducing layer; consequently, it is possible to allow a domain wall to smoothly shift in the reproducing layer.

This arrangement makes it possible to stably expand and reproduce a domain without causing a repetition of reproduction and to reproduce a signal having a period which is not more than an optical diffraction limit without reducing an amplitude of the reproduced signal, thereby dramatically improving a recording density.

Furthermore, instead of the first magnetic layer, the sixth magnetic layer and the seventh magnetic layer, which have different magnetic polarities, are used so as to reduce an influence of the leakage flux and to allow a domain wall to smoothly shift in the first magnetic layer; consequently, it is possible to stably expand and reproduce the domain wall without causing a repetition of reproduction.

Moreover, the fourth magnetic layer is made of a perpendicularly magnetized film whose coercivity is smaller and whose Curie temperature is higher as compared with the fifth magnetic layer so as to reduce a leakage flux appearing in the fourth magnetic layer and the fifth magnetic layer, to realize a smooth shift of the domain wall in the first magnetic layer, and to realize a recording in a low magnetic field.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a recording layer, an intermediate layer in which an area for interrupting an exchange coupling to said recording layer is formed at a predetermined temperature or more, and a reproducing layer which is made of a perpendicularly magnetized film whose domain wall coercivity is relatively smaller and whose domain wall mobility is relatively larger as compared with said recording layer around a predetermined temperature, wherein said reproducing layer is arranged so as to have a composition which, upon reproducing, is allowed to partially form an area whose temperature exceeds a Curie temperature of said reproducing layer, on the area of said intermediate layer that interrupts the exchange coupling.

2. The magneto-optical recording medium as defined in claim 1, wherein when said reproducing layer, said intermediate layer, and said recording layer respectively have Curie temperatures of Tc1, Tc2, and Tc3, Tc1, Tc2, and Tc3 satisfy a condition of Tc2<Tc1<Tc3.

3. The magneto-optical recording medium as defined in claim 2, further comprising a transparent dielectric made of at least one material selected from the group consisting of AlN, SiN, AlSiN, and $Ta_2O_3$, wherein said transparent dielectric is arranged so as to have a film thickness of approximately ($\lambda/(4n)$) when an emitted light beam has a wavelength of $\lambda$ and said transparent dielectric has a refractive index of n.

4. The magneto-optical recording medium as defined in claim 2, wherein said recording layer is a perpendicularly magnetized film made of at least one material selected from the group consisting of TbFe, TbFeCo, DyFe, DyFeCo, TbDyFe, and TbDyFeCo.

5. The magneto-optical recording medium as defined in claim 2, wherein said intermediate layer is a perpendicularly magnetized film made of at least one material selected from the group consisting of: TbFe, TbFeCo, DyFe, DyFeCo, TbDyFe, TbDyFeCo, TbFeD, TbFeCoD, DyFeD, DyFeCoD, TbDyFeD, and TbDyFeCoD(D is made of one or more elements selected from Y, Ti, V, Cr, Pd, Cu, Si, and Al).

6. The magneto-optical recording medium as defined in claim 2, wherein Tc1 satisfies a condition of 140° C.$\leq$Tc1$\leq$240° C.

7. The magneto-optical recording medium as defined in claim 2, wherein when said reproducing layer has a compensation temperature of Tcomp1, Tcomp1 satisfies a condition of −60° C.$\leq$Tcomp1.

8. The magneto-optical recording medium as defined in claim 2, wherein Tc1 and Tc2 satisfy a condition of 40° C.$\leq$Tc2$\leq$Tc1−40° C.

9. The magneto-optical recording medium as defined in claim 2, wherein Tc2 satisfies a condition of 40° C.$\leq$Tc2$\leq$140° C.

10. The magneto-optical recording medium as defined in claim 2, wherein Tc3 satisfies a condition of 180° C.$\leq$Tc3$\leq$300° C.

11. The magneto-optical recording medium as defined in claim 2, wherein when said recording layer has a compensation temperature of Tcomp3, Tcomp3 satisfies a condition of −40° C.$\leq$Tcomp3$\leq$Tc3.

12. The magneto-optical recording medium as defined in claim 2, wherein two magnetic films having different magnetic polarities are stacked so as to form said recording layer.

13. The magneto-optical recording medium as defined in claim 12, wherein said two magnetic films respectively have different magnetic polarities so that total magnetization of one of the magnetic films and total magnetization of the other magnetic film cancel each other.

14. The magneto-optical recording medium as defined in claim 12, wherein said two magnetic films have different magnetic polarities so that when one of the magnetic films has a TMrich composition which allows transition metal magnetic moment to normally exceed with respect to a compensation composition which allows rare earth metal magnetic moment and transition metal magnetic moment to balance each other, the other magnetic film has a RErich composition which allows rare earth metal magnetic moment to normally exceed with respect to the compensation temperature.

15. The magneto-optical recording medium as defined in claim 12, wherein with regard to said two magnetic films having different magnetic polarities, when one of the magnetic films has a Curie temperature of Tc4 and the other magnetic film has a Curie temperature of Tc5, Tc4 and Tc5 satisfy conditions of Tc2<Tc1<Tc4 and Tc2<Tc1<Tc5.

16. The magneto-optical recording medium as defined in claim 15, wherein Tc4 and Tc5 satisfy conditions of 180° C.$\leq$Tc4$\leq$300° C. and 180° C.$\leq$Tc5$\leq$300° C.

17. The magneto-optical recording medium as defined in claim 15, wherein: one of said magnetic films has a smaller coercivity than the other magnetic film, said reproducing layer is made of a perpendicularly magnetized film whose domain wall coercivity is smaller and whose domain wall mobility is larger as compared with the other magnetic film, and Tc4 and Tc5 satisfy a condition of Tc5<Tc4.

18. The magneto-optical recording medium as defined in claim 17, wherein two magnetic films having different magnetic polarities are stacked so as to form said reproducing layer.

19. The magneto-optical recording medium as defined in claim 2, further comprising a perpendicularly magnetized film serving as an auxiliary recording layer which has a smaller coercivity and a higher Curie temperature as compared with said recording layer.

20. The magneto-optical recording medium as defined in claim 2, wherein two magnetic films having different magnetic polarities are stacked so as to form said reproducing layer.

21. The magneto-optical recording medium as defined in claim 20, wherein said two magnetic films respectively have different magnetic polarities so that total magnetization of one of the magnetic films and total magnetization of the other magnetic film balance each other.

22. The magneto-optical recording medium as defined in claim 20, wherein said two magnetic films have different magnetic polarities so that when one of the magnetic films has a TMrich composition which allows transition metal magnetic moment to normally exceed with respect to a compensation composition which allows rare earth metal magnetic moment and transition metal magnetic moment to balance each other, the other magnetic film has a RErich composition which allows rare earth metal magnetic moment to normally exceed with respect to the compensation temperature.

23. The magneto-optical recording medium as defined in claim 20, wherein with regard to said two magnetic films, when one of the magnetic films has a Curie temperature of Tc6 and the other magnetic film has a Curie temperature of Tc7, Tc6 and Tc7 satisfy conditions of Tc2<Tc6<Tc3 and Tc2<Tc 7<Tc3.

24. The magneto-optical recording medium as defined in claim 23, wherein Tc6 and Tc7 satisfy conditions of 140° C.≦Tc6 and Tc7≦240° C.

25. The magneto-optical recording medium as defined in claim 23, wherein Tc6 and Tc7 are virtually the same.

26. The magneto-optical recording medium as defined in claim 2, wherein said recording layer has a film thickness ranging between 5 and 80 nm.

27. The magneto-optical recording medium as defined in claim 2, wherein said reproducing layer has a thickness ranging between 20 and 80 nm.

28. The magneto-optical recording medium as defined in claim 2, wherein said intermediate layer has a thickness ranging between 20 and 80 nm.

29. The magneto-optical recording medium as defined in claim 2, wherein said reproducing layer is a perpendicularly magnetized film made of at least one material selected from the group consisting of: GdFe, GdFeD, GdFeCoD(D is made of one or more elements selected from Y, Ti, V, Cr, Pd, Cu, Si, and Al), GdHRFe, GdHRFeCo, GdHRFeCoD(HR is a heavy rare earth metal, and is made of one or more elements selected from Tb, Dy, Ho, and Er, and D is made of one or more elements selected from Y, Ti, V, Cr, Pd, Cu, Si, and Al), GdLRFe, GdLRFeCo, and GdLRFeCoD(LR is a light rare earth metal, and is made of one or more elements selected from Ce, Pr, Nd, and Sm, and D is made of one or more elements selected from Y, Ti, V, Cr, Pd, Cu, Si, and Al).

30. The magneto-optical recording medium as defined in claim 1, wherein the area, whose temperature is increased to more than the Curie temperature in said reproducing layer, regulates a shift of a domain wall at both ends with regard to a shifting direction of the magneto-optical recording medium; and a shift of a domain wall on a shifting direction side of the magneto-optical recording medium appears in such a position that a domain expanded by the shift of the domain wall is located outside a light-beam irradiated area.

31. A magneto-optical recording medium comprising:

a recording layer, an intermediate layer in which an area for interrupting an exchange coupling to said recording layer is formed at a predetermined temperature or more, and a reproducing layer which is made of a perpendicularly magnetized film whose domain wall coercivity is relatively smaller and whose domain wall mobility is relatively larger as compared with said recording layer around a predetermined temperature, wherein: when said reproducing layer, said intermediate layer, and said recording layer respectively have Curie temperatures of Tc1, Tc2, and Tc3, Tc1, Tc2, and Tc3 satisfy a condition of Tc2<Tc1<Tc3, and said reproducing layer serves as a perpendicularly magnetized film at a temperature of not less than 25° C. and has a composition which allows rare earth metal magnetic moment to normally exceed transition metal magnetic moment at a temperature of not more than Tc1 with respect to a compensation composition which allows rare earth metal magnetic moment and transition metal magnetic moment to balance each other.

32. A magneto-optical recording medium comprising:

a recording layer, an intermediate layer in which an area for interrupting an exchange coupling to said recording layer is formed at a predetermined temperature or more, and a reproducing layer which is made of a perpendicularly magnetized film whose domain wall coercivity is relatively smaller and whose domain wall mobility is relatively larger as compared with said recording layer around a predetermined temperature, wherein when said reproducing layer, said intermediate layer, and said recording layer respectively have Curie temperatures of Tc1, Tc2, and Tc3, Tc1, Tc2, and Tc3 satisfy a condition of Tc2<Tc1<Tc3, and said reproducing layer has a compensation temperature, and a composition of said reproducing layer is arranged so as to set the compensation temperature at a temperature which does not prevent a shift of a domain wall in the area whose temperature is increased to more than a Curie temperature of said reproducing layer.

* * * * *